(12) United States Patent
Villacorta et al.

(10) Patent No.: US 8,452,698 B2
(45) Date of Patent: May 28, 2013

(54) SYSTEM AND METHOD FOR MANAGING CREDIT RISK FOR INVESTMENT PORTFOLIOS

(75) Inventors: Roland E. Villacorta, New York, NY (US); Scott J. Condron, Armonk, NY (US); Cheewee Chew, Princeton, NJ (US)

(73) Assignee: BlackRock, Inc., New York, NY (US)

( * ) Notice: Subject to any disclaimer, the term of this patent is extended or adjusted under 35 U.S.C. 154(b) by 597 days.

(21) Appl. No.: 11/103,381

(22) Filed: Apr. 11, 2005

(65) Prior Publication Data

US 2005/0273422 A1    Dec. 8, 2005

Related U.S. Application Data

(63) Continuation-in-part of application No. 10/685,865, filed on Oct. 15, 2003, now Pat. No. 8,219,487.

(51) Int. Cl.
*G06Q 40/00* (2012.01)

(52) U.S. Cl.
USPC ........................................................ 705/38

(58) Field of Classification Search
USPC ........................................................ 705/38
See application file for complete search history.

(56) References Cited

U.S. PATENT DOCUMENTS

| | | | |
|---|---|---|---|
| 5,502,637 A * | 3/1996 | Beaulieu et al. | 705/36 R |
| 5,819,271 A * | 10/1998 | Mahoney et al. | 1/1 |
| 5,864,871 A * | 1/1999 | Kitain et al. | 1/1 |
| 6,112,190 A * | 8/2000 | Fletcher et al. | 705/36 R |
| 6,772,146 B2 * | 8/2004 | Khemlani et al. | 705/36 R |
| 6,832,202 B1 * | 12/2004 | Schuyler et al. | 705/8 |
| 7,089,207 B1 * | 8/2006 | Lardy et al. | 705/38 |
| 7,461,077 B1 * | 12/2008 | Greenwood | 1/1 |
| 7,529,685 B2 * | 5/2009 | Davies et al. | 705/3 |
| 2001/0037233 A1 * | 11/2001 | Kinoshita | 705/10 |
| 2002/0026401 A1 * | 2/2002 | Hueler | 705/37 |
| 2002/0133365 A1 * | 9/2002 | Grey et al. | 705/1 |
| 2003/0083984 A1 * | 5/2003 | Crawford et al. | 705/38 |
| 2003/0117443 A1 * | 6/2003 | Langner et al. | 345/810 |

(Continued)

FOREIGN PATENT DOCUMENTS

| | | | |
|---|---|---|---|
| NZ | PCT/NZ03/00048 | * | 3/2003 |
| WO | WO 03/079232 A2 | * | 3/2003 |
| WO | WO 03/079232 | * | 9/2003 |

OTHER PUBLICATIONS

Mahoney, C: Rating Policy: The Bond Rating Process—Progress Report, Feb. 2002, pp. 1-4.*

(Continued)

*Primary Examiner* — Bijendra K Shrestha
(74) *Attorney, Agent, or Firm* — Edwards Wildman Palmer LLP; Scott D. Wofsy; Christopher J. Capelli

(57) ABSTRACT

A system is disclosed for enabling a portfolio manager to obtain credit approval for an issuer of securities from a credit analyst. The system includes a relational database containing subjective and objective issuer information, a graphical user interface for permitting a portfolio manager to submit a credit approval request to a credit analyst, a graphical user interface for permitting a credit analyst to evaluate the credit approval request submitted by the portfolio manager based on the issuer information contained in the database, and a graphical user interface for permitting the credit analyst to resolve the credit approval request on behalf of the portfolio manager.

12 Claims, 37 Drawing Sheets

U.S. PATENT DOCUMENTS

| | | | |
|---|---|---|---|
| 2003/0182215 A1* | 9/2003 | Ringler et al. | 705/35 |
| 2003/0187765 A1* | 10/2003 | Sgaraglio | 705/35 |
| 2003/0195868 A1* | 10/2003 | Wilson et al. | 707/3 |
| 2004/0133439 A1* | 7/2004 | Noetzold et al. | 705/1 |
| 2004/0158520 A1* | 8/2004 | Noh | 705/38 |
| 2005/0027645 A1* | 2/2005 | Lui et al. | 705/38 |
| 2005/0065874 A1* | 3/2005 | Lefner et al. | 705/38 |
| 2008/0215388 A1* | 9/2008 | Miri et al. | 705/7 |

OTHER PUBLICATIONS

Bassel: Range of practice in banks' internal ratings systems, Jan. 2000, pp. 1-46.*

VIP: Review : European Private Company data AMADEUS and Business Browser compared, Dec. 2003, Issue 1, pp. 1-24.*

Mahoney, C: Bond Rating Process: A progess Report, Feb. 2002, Moody Investors Service, Global Credit Research, pp. 1-4.*

* cited by examiner

KIMBERLY - CLARK CORPORATION (KMB)

| Corp. Structure | | | |
|---|---|---|---|
| LEH Industry: | Consumer Products | Issuer Ratings: | M / S / F |
| SIC code: | Paper mills (2621) | | Aa2/AA/AA |
| Issuance Type: | Corp/BHC-level Issuer | | P-1/A-1+/F1+ |

Parent: KIMBERLY-CLARK CORPORATION (494368)
Ultimate: KIMBERLY-CLARK CORPORATION (494368)

ISSUER ID: 494368

Tabs: Sections | Research | Ratings | Related | Tree | Limits | Analytics | Corp. Actions | Equity | Audit Side tabs: Overview / Taxable

Taxable / Dependencies

| List Name | Action | Maturity Restriction | Source | Apply? |
|---|---|---|---|---|
| Primary | Add | ☐ | BFM | ☑ |
| First Tier | Add | ☐ | BFM | ☑ |
| SecondTier | Add | ☐ | BFM | ☐ |
| IDR | Add | ☐ | BFM | ☐ |
| Separate Account | Add | ☐ | BFM | ☐ |
| Grade 1 & 2 Credit Enhancers | Add | ☐ | BFM | ☐ |
| Grade 1 Credit Enhancers | Add | ☐ | BFM | ☐ |
| Grade 2 Credit Enhancers | Add | ☐ | BFM | ☐ |
| Grade 3 Credit Enhancers | Add | ☐ | BFM | ☐ |
| Grade 1 & 2 Corporate Underlier | Add | ☐ | BFM | ☐ |
| Grade 1 Corporate Underlier | Add | ☐ | BFM | ☐ |
| Grade 2 Corporate Underlier | Add | ☐ | BFM | ☐ |

| File Edit View Favorites Tools Help | | | | | | | | | |
|---|---|---|---|---|---|---|---|---|---|
| General Search: Ticker dd | | Analyst | | Approvals | | | | Back Forward | |
| Lehman Sector | | Research | | Suspensions | | | | | |
| Report Corporate Tree | | Port Group ALL_FI,EQ_DOM,EQ_INTL,ALL_BIMC Default Galileo Port Groups | | | | ☐ Show Unreviewed Issuers | | | |
| | | | | | | ☑ Show Issuers with Exposure Only | | | |
| Tree Lists Research Credit Status | | | | | | ☐ Favorites ☑ auto run | | | |

| | Issuer(s) ID | Credit Approvals | Funds | Exposure (T-1B) | Face | Research | Security Type | Mdys | S&P |
|---|---|---|---|---|---|---|---|---|---|
| ☒ EI DU PONT DE NEMOURS & CO DD | 263534A ▼ | Primary... | 48 | $69,338,091 | 65,833,558 | 10/26/2004 | | Aa3,P-1, | AA,A |
| 3 issued Securities held in ALL_FI,EQ_DOM,EQ_INTL,ALL_BIMC | | | 45 | $50,595,766 | 55,233,568 | | | | |
| ☐ DU PONT (E I) DE NEM DD | 263534109 | | 2 | $25,308 | 600 | | EQUITY | | AA,A |
| ☐ DU PONT (E.I.) DE NEM DD 6.520 10/17/2005 | 26353LHJ3 | | 4 | $3,194,302 | 3,000,000 | | CORP | Aa3, | AA,A |
| ☐ DU PONT (E I) DE NEM DD 8.250 09/15/2006 | 263534AW9 | | 2 | $2,217,553 | 2,000,000 | | CORP | Aa3, | AA,A |
| ☐ DU PONT EI DE NEM DD 5.875 05/11/2009 | B03627823 | | 3 | $692,412 | 620,000 | | CORP | Aa3, | NR, |
| ☐ DU PONT (E.I.) DE NE DD 6.875 10/15/2009 | 263534BJ7 | | 6 | $7,830,371 | 6,835,000 | | CORP | Aa3, | AA, |
| ☐ DU PONT (E.I.) DE NE DD 4.125 04/30/2010 | 263534BM0 | | 13 | $24,608,776 | 23,825,000 | | CORP | Aa3, | AA, |
| ☐ DU PONT EI NEMOUR DD 4.750 11/15/2012 | 263534BK4 | | 8 | $17,494,605 | 16,700,000 | | CORP | Aa3, | AA, |
| ☐ DU PONT(E.I.) DE NE DD 6.500 01/15/2028 | 263534BG3 | | 8 | $2,593,234 | 2,245,000 | | CORP | Aa3, | AA, |
| No Enhanced Securities held in ALL_FI,EQ_DOM,EQ_INTL,ALL_BIMC | | | | | | | | | |
| ☒ 2 Underlying Securities held in ALL_FI,EQ_DOM,EQ_INTL,ALL_BIMC | | | 3 | $10,672,325 | 10,600,000 | | | | |
| ☐ BALTIMORE MD PORT DU BALTRV 8.500 10/01/2011 | 059229AK0 | Grade 1 Approved... | 1 | $1,061,833 | 1,000,000 | 2/15/2000 | MUNI | Aa3, | AA,A- |
| ☐ SALEM CNTY NJ PCRB - BALPOL Floater 03/01/2012 | 794103AE1 | Grade 1 Approved... | 2 | $9,610,492 | 9,600,000 | 2/15/2000 | MVRDN | Aa3,P-1, | AA,A-, |
| ☐ PIONEER HI-BRED INTERNATIONAL, INC. DD | 723686 | | | | | 2/26/2000 | | NA,NA, | NA,NA, |

SYSTEM AND METHOD FOR MANAGING CREDIT RISK FOR INVESTMENT PORTFOLIOS

CROSS-REFERENCE TO RELATED APPLICATION

The subject application is a continuation-in-part of U.S. patent application Ser. No. 10/685,865 filed Oct. 15, 2003 now U.S. Pat. No. 8,219,487.

COPYRIGHT NOTICE

A portion of the disclosure of this patent document contains material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND OF THE INVENTION

1. Field of the Invention

The subject invention relates to financial portfolio management, and more particularly, to a system and method for managing credit risk as it relates to fixed income securities and equities.

2. Background of the Related Art

Evaluating and managing credit risk is a critical aspect of portfolio management. The first step in examining credit risk is to accurately determine credit exposures, which may come from issuance, credit enhancement, contractual arrangements, counterparty relationships, etc. After identifying all of the exposures, the next step is to assess the individual credit worthiness of each identified entity versus the potential effect exposure to that entity might have on the expected yield/return. There are quantitative methods to determine the probability of default of each entity (e.g., methods employed in Moody's KMV's credit risk products such as EDF™ for determining the expected default frequency), but quantitative measures are ultimately supplemented with subjective evaluations and opinions of credit analysts and commentaries from market observers at the entity-level or industry/sector-level, or with regard to factors such as the capital structure, agency rating or market data.

It would be beneficial to provide a relational database containing subjective and objective information relating to credit entities underlying capital investment securities, and to provide a web-based system and method which enables a credit analyst to readily access the information in the database to evaluate the credit worthiness and risk associated with the above mentioned credit entities.

It is important to ensure that there are no unknown divergences between credit analysts and the portfolio manager's investment choices. Portfolio managers must be fully aware of the determinations made by credit analysts with regard to possible investments. Thus, it would also be beneficial to provide a web-based system and method that enables portfolio managers and credit analysts to readily communicate with one another to obtain credit approval for a credit entity in an effective and efficient manner.

SUMMARY OF THE INVENTION

The subject invention is basically directed to a new and useful system for enabling a portfolio manager or trader to obtain credit approval for an issuer of securities from a credit analyst. The system includes a relational database containing information about issuers of securities in the form of subjective data and objective data. Means are provided for permitting a portfolio manager to submit a credit approval request to a credit analyst, and means are provided for broadcasting the credit approval request to the credit analyst for evaluation. The means for submitting a credit approval request includes a graphical user interface having a data entry field for entering a description of the request. Preferably, the graphical user interface permits a portfolio manager to assign a degree of relative importance to the credit approval request in another data entry field.

Means are also provided for permitting a credit analyst to evaluate the credit approval request submitted by the portfolio manager based on the issuer information contained in the database. This involves graphical user interfaces enabling ready access to information contained in the issuer database. The system further includes means for permitting the credit analyst to resolve the credit approval request on behalf of the portfolio manager. The means for permitting the credit analyst to resolve the credit approval request includes a graphical user interface accessible by the credit analyst for specifying a resolution to the credit approval request in a data field.

Preferably, the graphical user interface is adapted and configured to permit the credit analyst to resolve the credit approval request on behalf of the portfolio manager by adding an issuer to at least one list of approved issuers. In an embodiment of the subject invention, the system also includes means for providing the portfolio manager with status messages indicating the status of a credit approval request. Preferably, the means for providing status messages includes a graphical display providing color-coded status messages to the portfolio manager.

The subject invention is also directed to a system for enabling a portfolio manager to obtain credit approval for an issuer of securities from a credit analyst that includes means for submitting a credit approval request to a credit analyst, means for monitoring the status of the credit approval request, means for managing the status of the credit approval request, and means for resolving the credit approval request on behalf of the portfolio manager. Preferably, the means for submitting a credit approval request for an issuer includes a graphical user interface accessible by a portfolio manager for entering a description of the request in a data field, and the means for monitoring the status of the credit approval request includes a graphical display, which provides color-coded status messages viewable by the portfolio manager.

Preferably, the means for managing the status of the credit approval request includes a graphical user interface accessible by the credit analyst for specifying the status of the credit approval request in a data field, and the means for resolving the credit approval request includes a graphical user interface accessible by the credit analyst for specifying a resolution to the credit approval request in a data field. The resolution to the credit approval request is preferably selected from the group of actions consisting of adding an issuer to a list of approved issuers, restricting the maturity of an issuer, suspending an issuer, re-instating an issuer, or removing an issuer from a list of approved issuers.

The subject invention is also directed to a method of providing credit approval, which includes the steps of receiving a credit approval request from a portfolio manager, evaluating the credit approval request based upon objective and subjective information stored in a database, managing the status of the credit approval request, and resolving the credit approval request on behalf of the portfolio manager. In one instance, the credit approval request relates to an issuer of securities (e.g., a corporation or municipality). In another instance, the credit approval request relates to a particular security (e.g., an asset backed security or municipal security). Thus, the credit approval request can be resolved on behalf of the portfolio manager on an issuer level or on a security level. Preferably, the step of managing the status of the credit approval request includes communicating status messages to the portfolio manager, and the step of resolving the credit approval request includes communicating a resolution to the credit approval request to the portfolio manager.

The subject invention is further directed to a system for enabling a credit analyst to evaluate credit risk associated with financial instruments based on subjective research. The system includes a database containing credit-worthiness data including research notes relating to financial instruments, issuers, credit enhancers, credit underliers, sponsors, or any factors that may affect credit-worthiness. Means are provided for loading the credit-worthiness data from the database into a graphical user interface based upon user specified search criteria, and means are associated with the graphical user interface for retrieving research notes based on user specified search criteria to enable a credit analyst to evaluate credit risk associated with an issuer.

The search criteria for loading credit-worthiness data from the database may be issuer based or industry sector based, whereas the search criteria for retrieving research notes from the database may be based on the publication date of a research note, an industry sector, or a research category, such as, for example, an analyst update, a management update, a research report or external research/news.

The system further includes means for viewing the textual content of a research note that has been retrieved. Preferably, the means for viewing the content of a research note that has been retrieved includes a user selectable, subject matter based data link. In addition, the system includes means for creating a report that contains the textual content of research notes based upon user specified search criteria. The search criteria for creating a report that contains the textual content of research notes may be based on the publication date of a research note, a research category, or an industry sector. The system also includes means for adding new research notes to the database for subsequent retrieval. Preferably, the means for adding a new research note to the database is adapted and configured to add a new research note to a corporate tree, or to an entire industry sector.

The subject invention is also directed to a system for monitoring the status of credit approval requests. The system includes a database containing data relating to a plurality of credit approval requests including the status of outstanding requests and workflow requests. Means are provide for loading approval request data from the database into a graphical user interface based upon user specified search criteria. The graphical user interface includes a first table summarizing the status of all outstanding requests related to the search criteria and a second table summarizing the status of all workflow requests related to the search criteria. Means are associated with the first and second tables for facilitating retrieval of outstanding requests and workflow requests, respectively, to determine the status of such requests.

The search criteria for loading credit approval request data from the database is based on a user specified date range. The first and second tables are configured to summarize outstanding requests and workflow requests for different types of issuers, including taxable issuers, new issuers and municipal issuers. The means associated with the first and second tables for facilitating retrieval of outstanding requests and workflow requests are user selectable, numerical based data links. In addition, means are provided for changing the status of outstanding requests and workflow requests that have been retrieved.

The subject invention is also directed to a system for enabling a credit analyst to conduct periodic reviews to determine whether issuers are on a credit approval list and to make changes to the credit approval list as needed. The system includes a database containing data relating to credit approval list expirations for a plurality of issuers including upcoming approval list expirations and recent approval list expirations. Means are provided for loading upcoming approval list expirations from the database into a graphical user interface, to enable a credit analyst to review issuers that will expire from their approval lists within a predetermined time period, for example, within 30 days. The system further includes means for selecting an issuer to review the time period remaining until said issuer expires from its approval list, and means for changing the time period remaining until said issuer expires from its approval list. Preferably, the means for changing the time period remaining until the issuer expires from its approval list is configured to change the time period to a predefined time period.

The system further includes means for loading recent approval list expirations from the database into the graphical user interface, to enable a credit analyst to review issuers that have expired from their approval lists during a predetermined time period. In addition, means are provided for adding an issuer that has recently expired from its approval list to an approval list. The system further includes means for loading recent credit rating changes from the database into the graphical user interface, to enable a credit analyst to review issuers that have been upgraded, downgraded and for which coverage has been initiated. In addition, means are provided for changing an approval list for an issuer based on a new credit rating.

These and other aspects of the system and method of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the method and system of the present invention, embodiments thereof will be described in detail hereinbelow with reference to the drawings, wherein:

FIG. 3 is a depiction of a graphical user interface configured in accordance with a preferred embodiment of the subject invention that displays an overview for a selected issuer based on information from the issuer database including corporate and fiscal information, market information such as exchange closing prices and credit enhancements;

FIG. 4 is a depiction of a graphical user interface configured in accordance with a preferred embodiment of the subject invention that displays information from the issuer database regarding the industry sectors for a selected issuer;

FIG. 5 is a depiction of a graphical user interface configured in accordance with a preferred embodiment of the subject invention that displays research information for a selected issuer compiled by users and stored in the issuer database;

FIG. 7 is a depiction of a graphical user interface configured in accordance with a preferred embodiment of the subject invention that displays securities that are related to or issued by a selected issuer and that are stored in the issuer database;

FIG. 14 is a depiction of the graphical user interface of FIG. 13, with multiple rows of data presented, at a final stage of the credit approval process;

FIG. 15 is a depiction of a graphical user interface which enables an analyst to add an issuer to an approved credit list selected from a group of credit lists;

FIG. 17 is a depiction of the graphical user interface that enables an analyst to add an issuer to multiple credit lists;

FIG. 21 shows the graphical user interface of FIG. 19 with a table of research notes obtained by entry of user selected search criteria;

FIG. 24 shows the graphical user interface of FIG. 19 with a corporate tree table containing issuer data and references to research notes and a window containing a list of selected research notes;

FIG. 25 shows the graphical user interface of FIG. 19, as depicted in FIG. 24, here the window contains a pane showing a specific research note selected from the list f research notes;

FIG. 26 shows the graphical user interface of FIG. 19 with an available actions menu presented for adding new research notes;

FIG. 29 shows the graphical user interface of FIG. 19 with a table of upcoming approval list expirations;

FIG. 30 shows an approval lists table depicting the details of an upcoming expiration;

FIG. 33 shows the graphical user interface of FIG. 19 with a table of recent approval list expirations;

FIG. 35 shows the graphical user interface of FIG. 19 with tables showing issuers that have been upgraded, downgraded or for which coverage has been recently initiated.

FIG. 37 shows the graphical user interface of FIG. 36 in which the exemplary family tree view has been "expanded" to illustrate the specific securities in connection with the entity that contribute to the exposure in the selected portfolio groups.

DETAILED DESCRIPTION OF PREFERRED EMBODIMENTS

The subject invention is directed to a new and useful credit risk management system that is particularly adapted and configured to enable a portfolio manager, trader investor, agent or custodian to request and obtain credit approval for an issuer of financial securities (e.g., a corporation or municipality) prior to executing a transaction involving an issued security. The system is further adapted and configured to enable a credit analyst to evaluate/analyze a request for credit approval based upon subjective and objective data related to the issuer that has been compiled, organized and stored in a relational database.

Those skilled in the art will also readily appreciate that a credit risk management system configured in accordance with the present disclosure includes the various computer and network related software and hardware that may be used in a distributed computing network, that is, programs, operating systems, memory storage devices, input/output devices, data processors, servers with links to data communication systems, wireless or otherwise, such as those which take the form of a local or wide area network, and a plurality of data terminals within the network, such as personal computers. Those skilled in the art will further appreciate that, so long as its users are provided with access to a system and method constructed in accordance with the present disclosure, the type of network, software or hardware is not vital to its full implementation.

Figure 1:
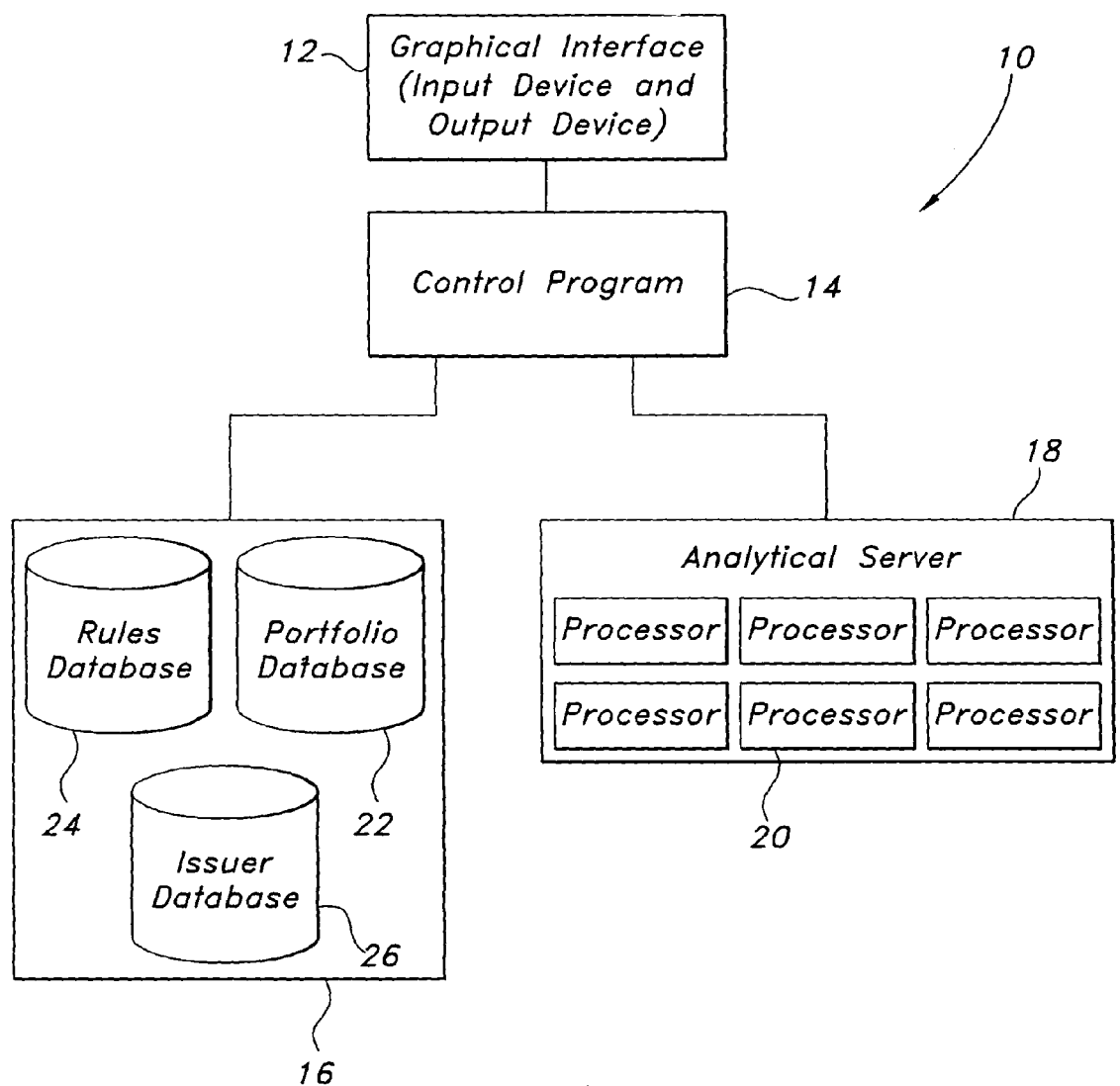
FIG. 1 is a schematic diagram depicting the core functional components of a computer-based system for managing credit risk for investment portfolios configured in accordance with a preferred embodiment of the subject invention.

Referring now to the drawings wherein like reference numerals identify similar aspects, components or features of the subject invention, there is illustrated in FIG. 1 a schematic representation of the core functional components of the computerized, web-based credit risk management system of the subject invention, which is designated generally by reference numeral 10. It should be understood that system 10 is adapted and configured to function independently while also interacting with other web-based systems such as, for example, an enterprise investment management system that features trade entry, trade settlement, cash management and payment processing tools, as well as an integrated compliance module which monitors investment decisions to ensure that the investment and portfolio composition as a whole remain in compliance with the investment objectives of a particular investor.

In particular, system 10 provides, preferably through a set of graphical user interfaces (GUI's) 12, a credit risk management system for submitting and evaluating requests for credit approval. Preferably, the graphical user interfaces (also referred to herein as "screens") used by system 10 incorporate user-friendly features and fit seamlessly with other operating system interfaces, that is, in a framed form having borders, multiple folders, toolbars with pull-down menus, embedded links to other screens and various other selectable features associated with animated graphical representations of depressible buttons. These features can be selected (i.e., "clicked on") by the user via connected mouse, keyboard, or other commonly used tool for indicating a preference in a computerized graphical interface.

With continuing reference to FIG. 1, the graphical user interfaces 12 define collectively the input and output devices for system 10, which enables portfolio managers, traders and credit analysts to receive and report data in accordance with the present invention. These devices are operatively associated with a data storage device or memory 16 and an analytical server 18. Memory 16 preferably contains a portfolio database 22 which stores a plurality of portfolios each containing fixed income securities, a rules database 24 storing a plurality of compliance rules or guidelines relating to the portfolios contained in portfolio database 22, and an issuer database 26 storing subjective and objective data about issuers of fixed income securities.

Analytical server 18 preferably includes one or more processors 20 which communicate with a control program 14. Control program 14 preferably contains an instruction set written in a conventional computing language such as HTML, C++ or Java, for coordinating the interactive relationship between memory 16, the processors 20 of server 18, and the graphical interfaces 12.

Figure 2:
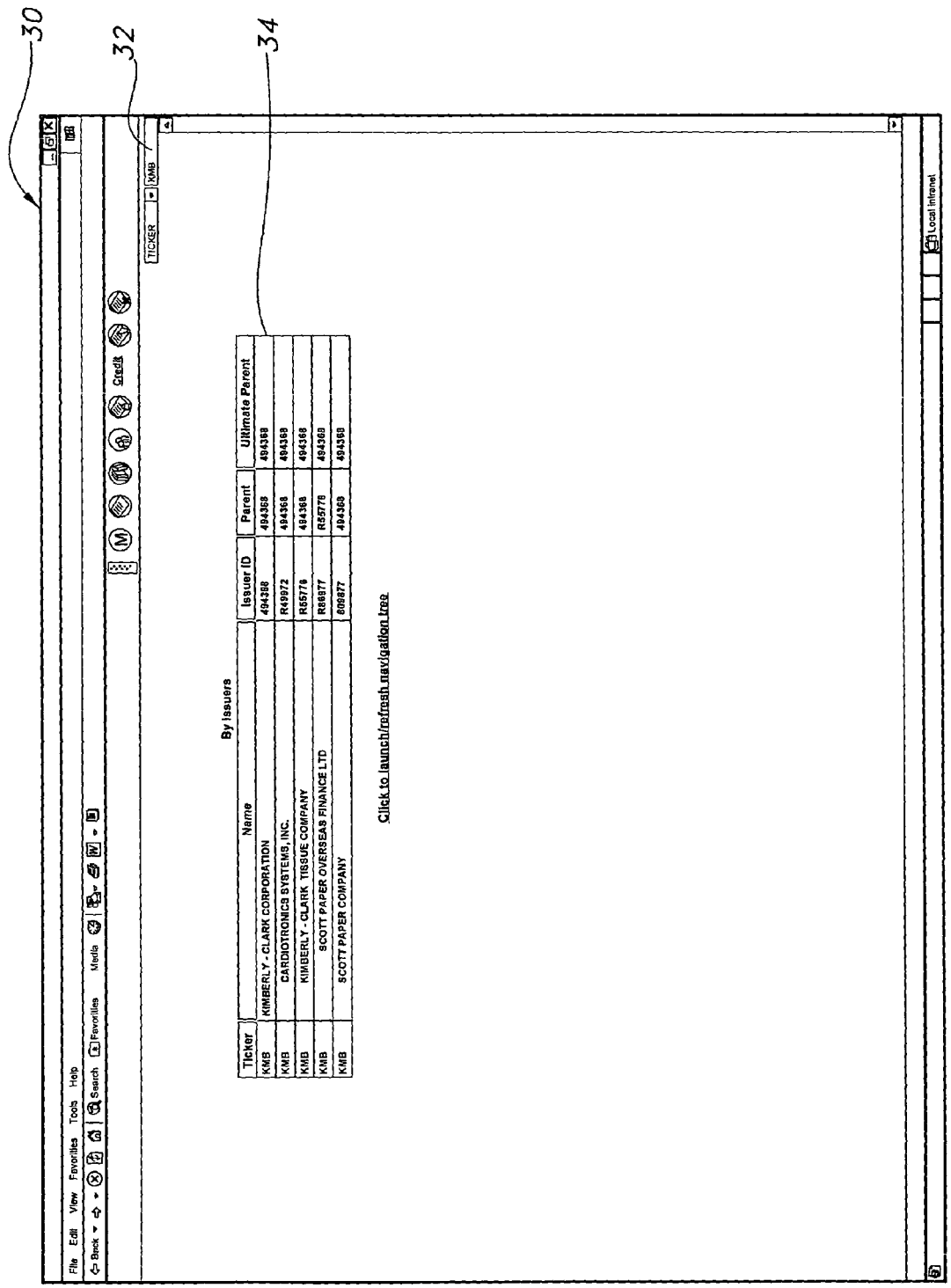
FIG. 2 is a depiction of a graphical user interface configured in accordance with a preferred embodiment of the subject invention that enables a user to enter a ticker symbol for a given issuer in a data input field to obtain tabulated information on the corporate structure and corporate relationships of the issuer from an issuer database containing objective and subjective data about issuers.

Referring to FIG. 2, there is depicted a graphical user interface screen 30 that is adapted and configured to enable a user (e.g., a credit analyst) to obtain information from issuer database 26 about an issuer of securities. The information is used to evaluate a credit approval request from a portfolio manager or trader, as will be discussed in greater detail below with respect to the process flowchart illustrated in FIG. 9. The information associated with screen 30 can be obtained in any number of ways including, for example, entering a ticker symbol for a given issuer of fixed income securities (i.e., KMB the ticker symbol for Kimberly Clarke) in data input field 32 of screen 30, or by entering an issuer identification number such as a CUSIP identifier (e.g., 484368) in the same field. The information obtained by the credit analyst is set forth in table 34 and includes data on the corporate structure (e.g., parent/subsidiary) and corporate relationships (e.g., share ownership) of the issuer.

Figure 3:
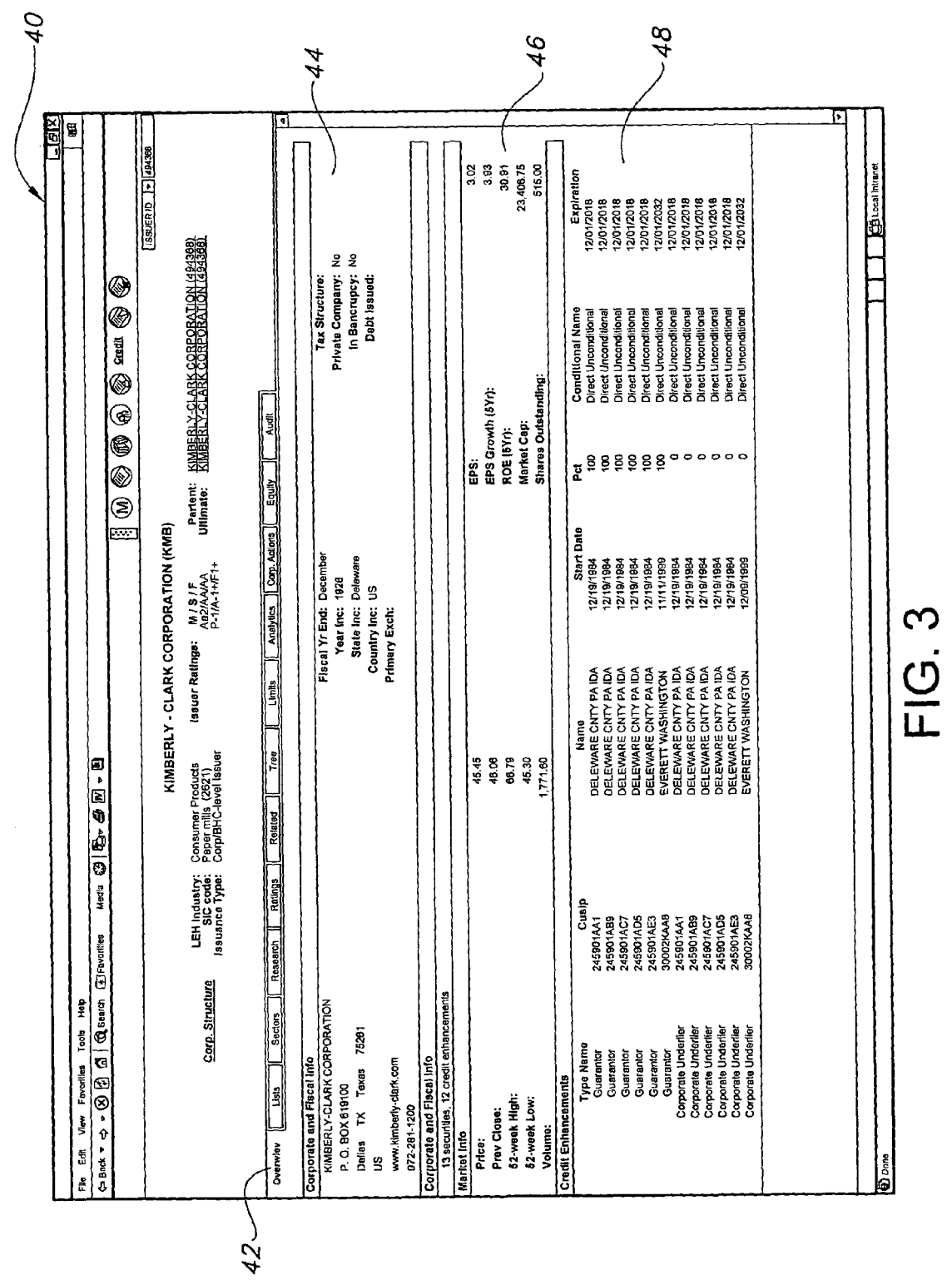

FIG. 3 depicts a graphical user interface screen 40 that is adapted and configured to display descriptive information about the selected issuer (i.e., Kimberly-Clark Corporation). Screen 40 is accessed by selecting the "Overview" tab 42. The information displayed is obtained from the issuer database 26 and includes, for example, corporate and fiscal data in display field 44, market data such as exchange closing prices in display field 46 and credit enhancements shown in display field 48. This information is used by the credit analyst to evaluate the credit worthiness of the issuer.

Figure 4:
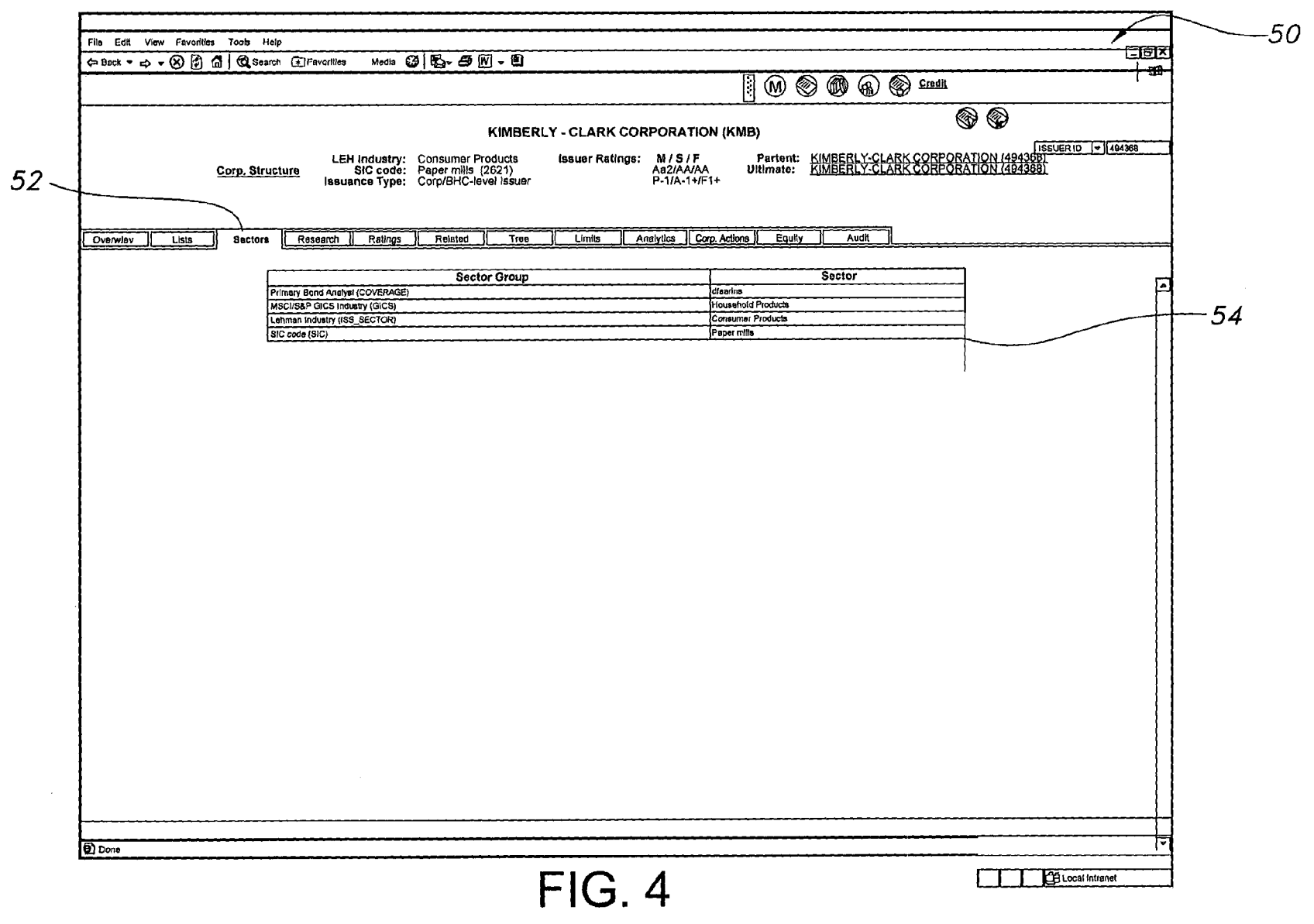

FIG. 4 depicts a graphical user interface screen 50 that is adapted and configured to display information from the issuer database 26 regarding the industry sectors or sector groups for a selected issuer of securities. Screen 50 is accessed by selecting the "Sectors" tab 52. In the case of Kimberly-Clarke Corporation, the identified sectors displayed in table 54 of screen 50 include household and consumer products, and paper mills. This information is also used by the credit analyst to evaluate the credit worthiness of the issuer.

Figure 5:
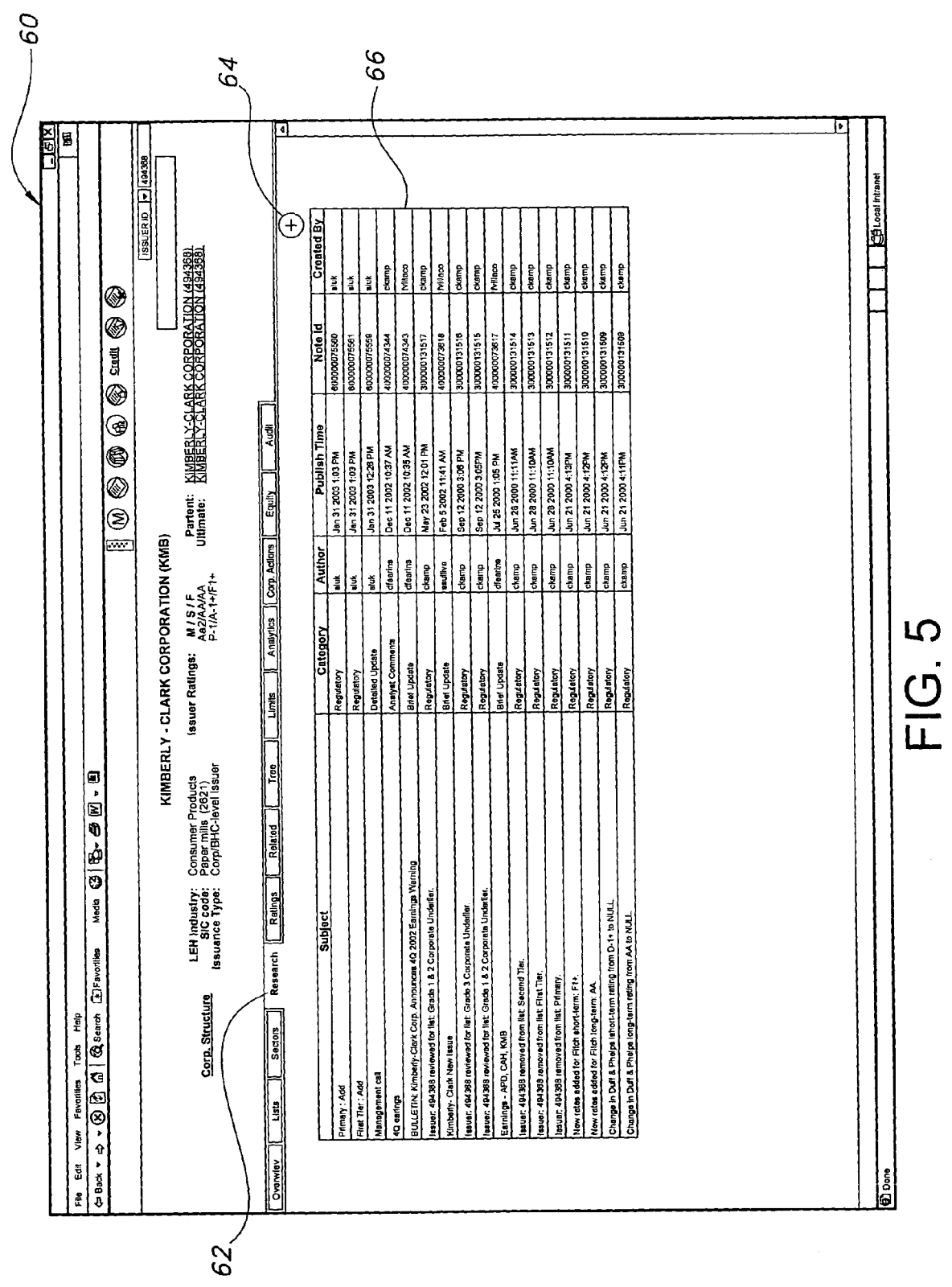

Referring to FIG. 5, there is depicted a graphical user interface screen 60 that is adapted and configured to display research information for a selected issuer of securities that has been compiled by users and stored in the issuer database 26. This qualitative information may be accessed by selecting the "Research" tab 62. The subjective research information displayed on screen 60 is derived from the comments and/or views of various credit analysts associated with the system of the subject invention. These analyst comments can involve, for example, regulatory issues, earnings reports or credit ratings from outside agencies. In use, an analyst may select icon 64 to add a comment to table 66 using a conventional text editor. It is envisioned that the analyst comments can be linked to documents, reports or other types of attachments stored in the database that may be readily accessed by the analyst. This information is used by the credit analyst to evaluate the credit risk associated with an issuer.

Figure 6:
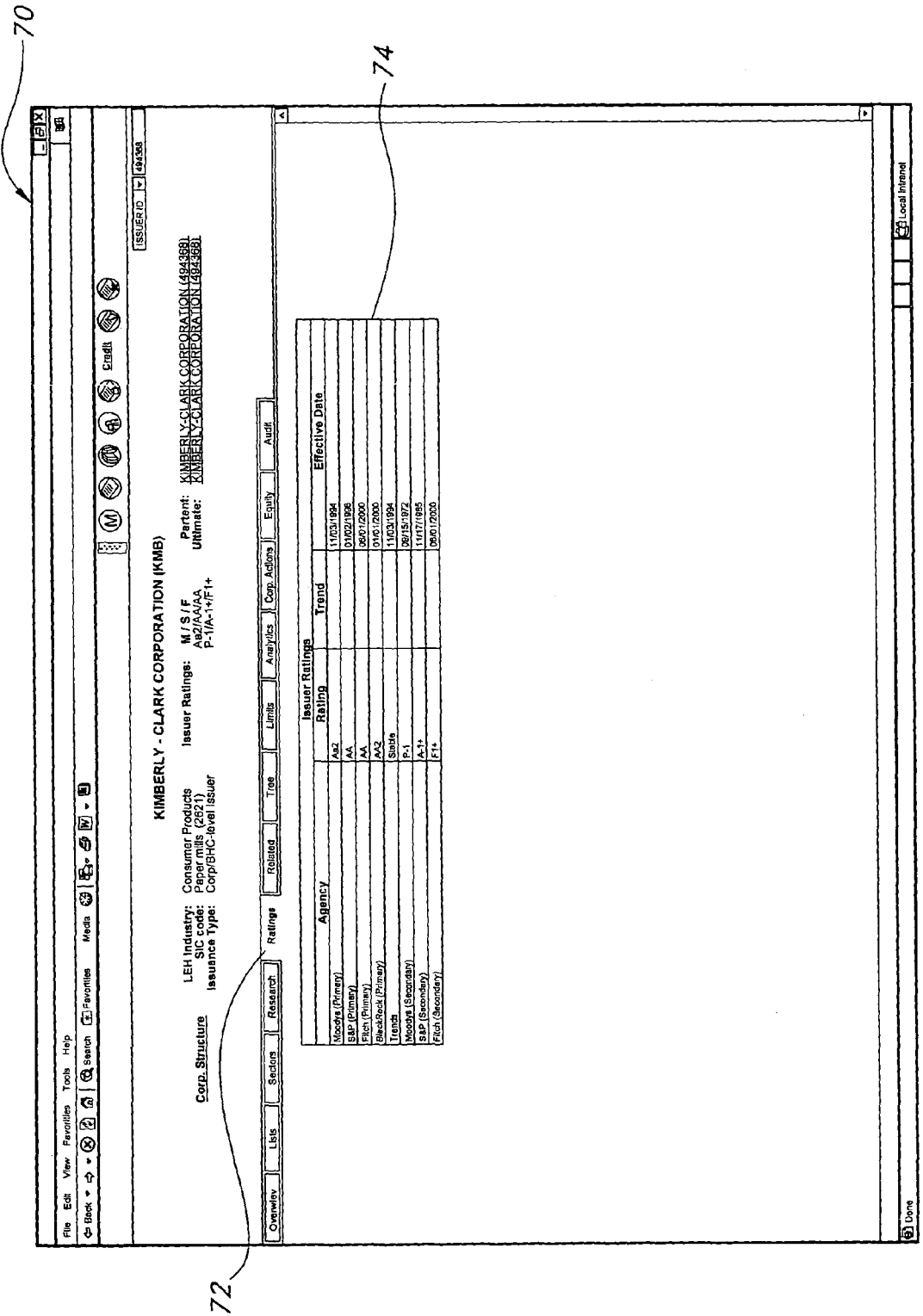
FIG. 6 is a depiction of a graphical user interface configured in accordance with a preferred embodiment of the subject invention that displays ratings information for a selected issuer that are stored in the issuer database.
Figure 7:
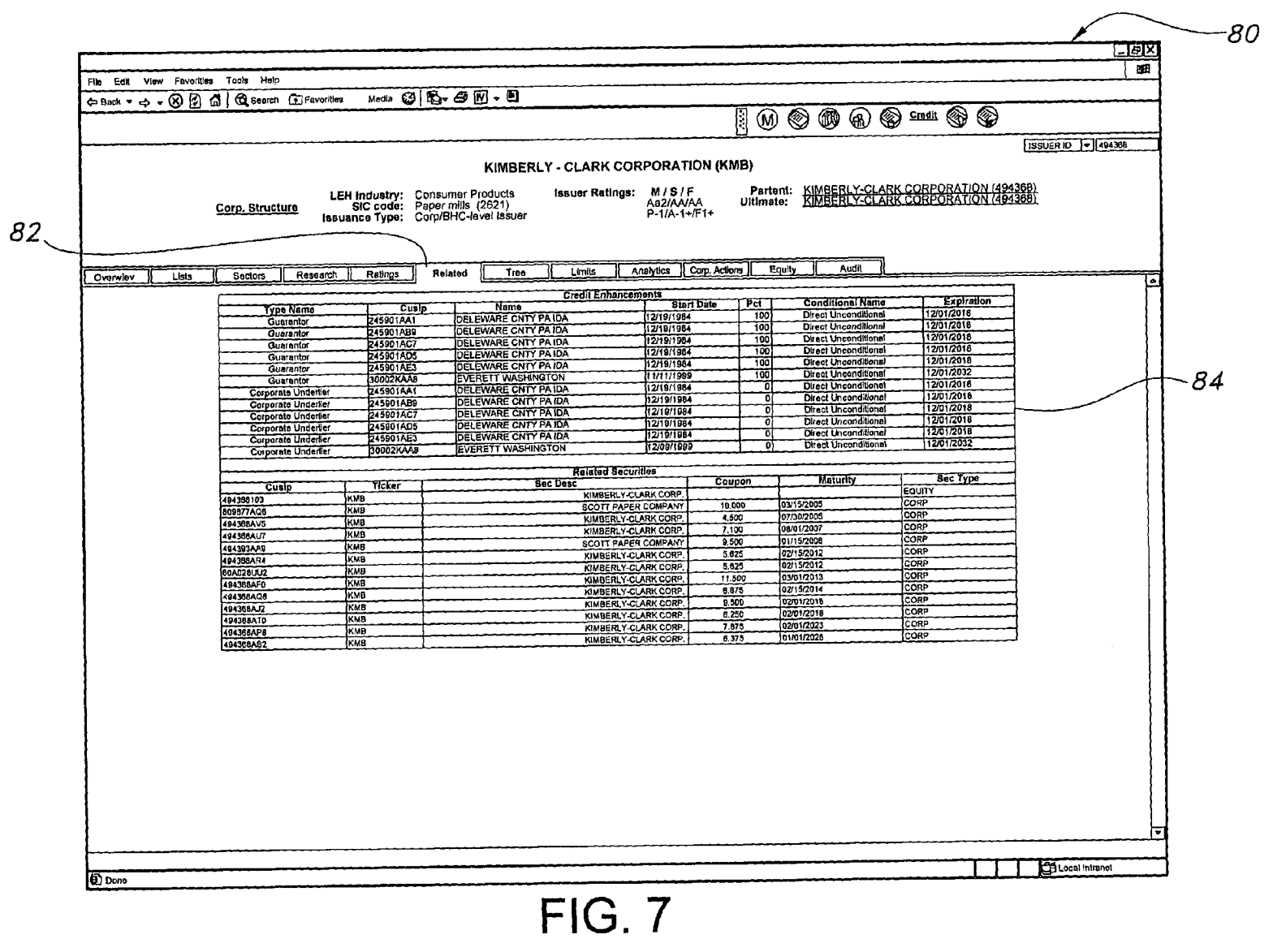

Referring to FIG. 6, there is depicted a graphical user interface screen 70 that may be accessed by a credit analyst by selecting "Ratings" tab 72, and which displays a table of ratings information 74 for a selected issuer of securities that are stored in the issuer database 26. The ratings information includes agency ratings such as, for example, Moody's, S&P and Fitch's ratings, and may be used by the credit analyst in evaluating risk. Similarly, FIG. 7 depicts a graphical user interface screen 80 that may be accessed by selecting "Related" tab 82, and which displays a table of securities 84 that are related to or issued by a selected issuer. In this case, table 84 displays securities that are related to Kimberley-Clarke Corporation, such as, for example, securities issued by Scott Paper Company. This information is also stored in issuer database 26, and may be utilized by a credit analyst to evaluate the credit worthiness of an issuer of securities.

Figure 8:
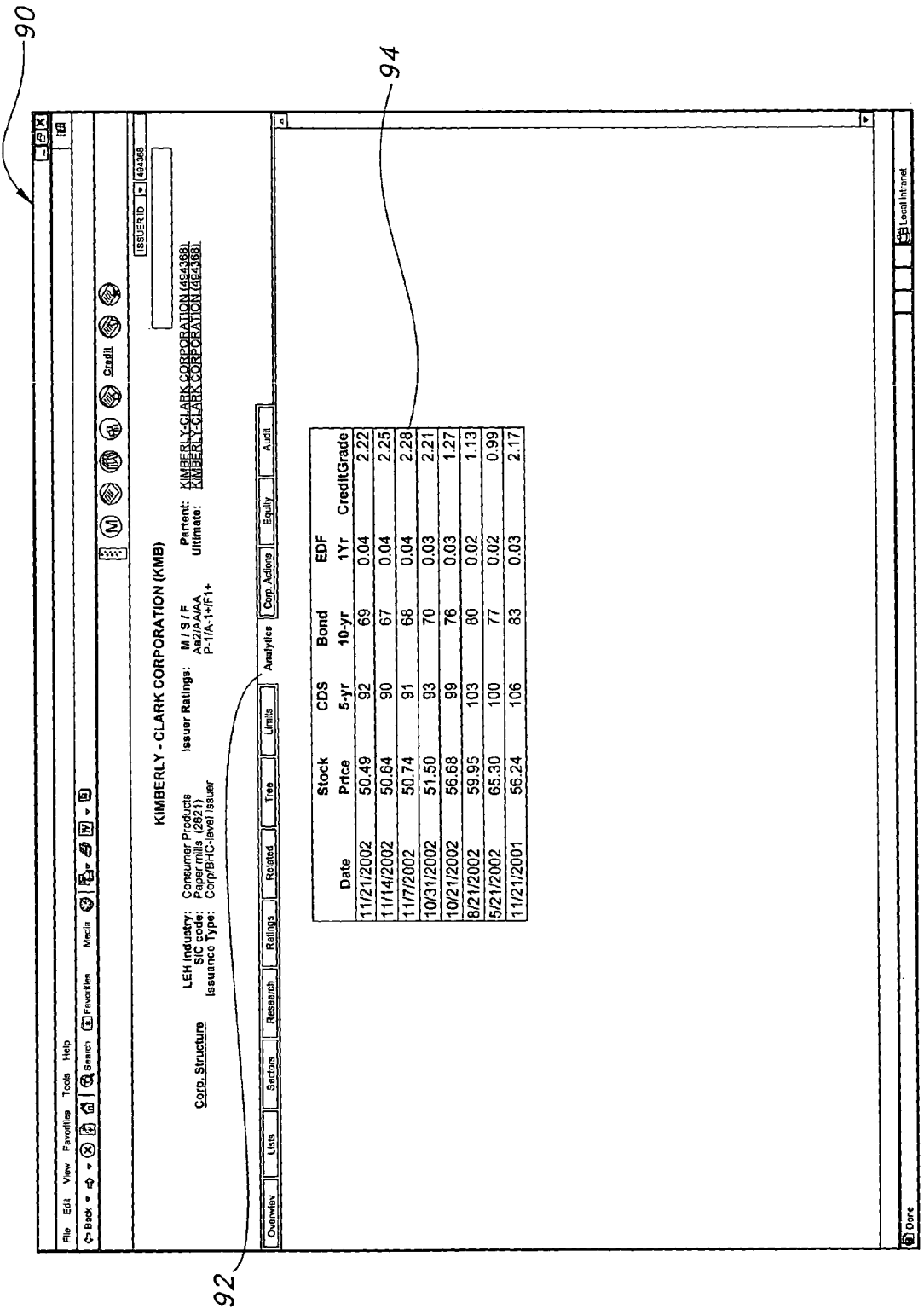
FIG. 8 is a depiction of a graphical user interface configured in accordance with a preferred embodiment of the subject invention that displays market analytics that are related to a selected issuer and that are stored in the issuer database.

FIG. 8 depicts a graphical user interface screen 90 that displays additional information in the form of market analytics for a selected issuer. This information, which is stored in issuer database 26, may be accessed by selecting "Analytics" tab 92. The information, which is displayed in table 94, provides the credit analyst with an indication of what the market thinks of a particular issuer, and includes, for example, stock prices, credit defaults swap spreads, bond yields and credit grades in a chronological order.

Figure 9:
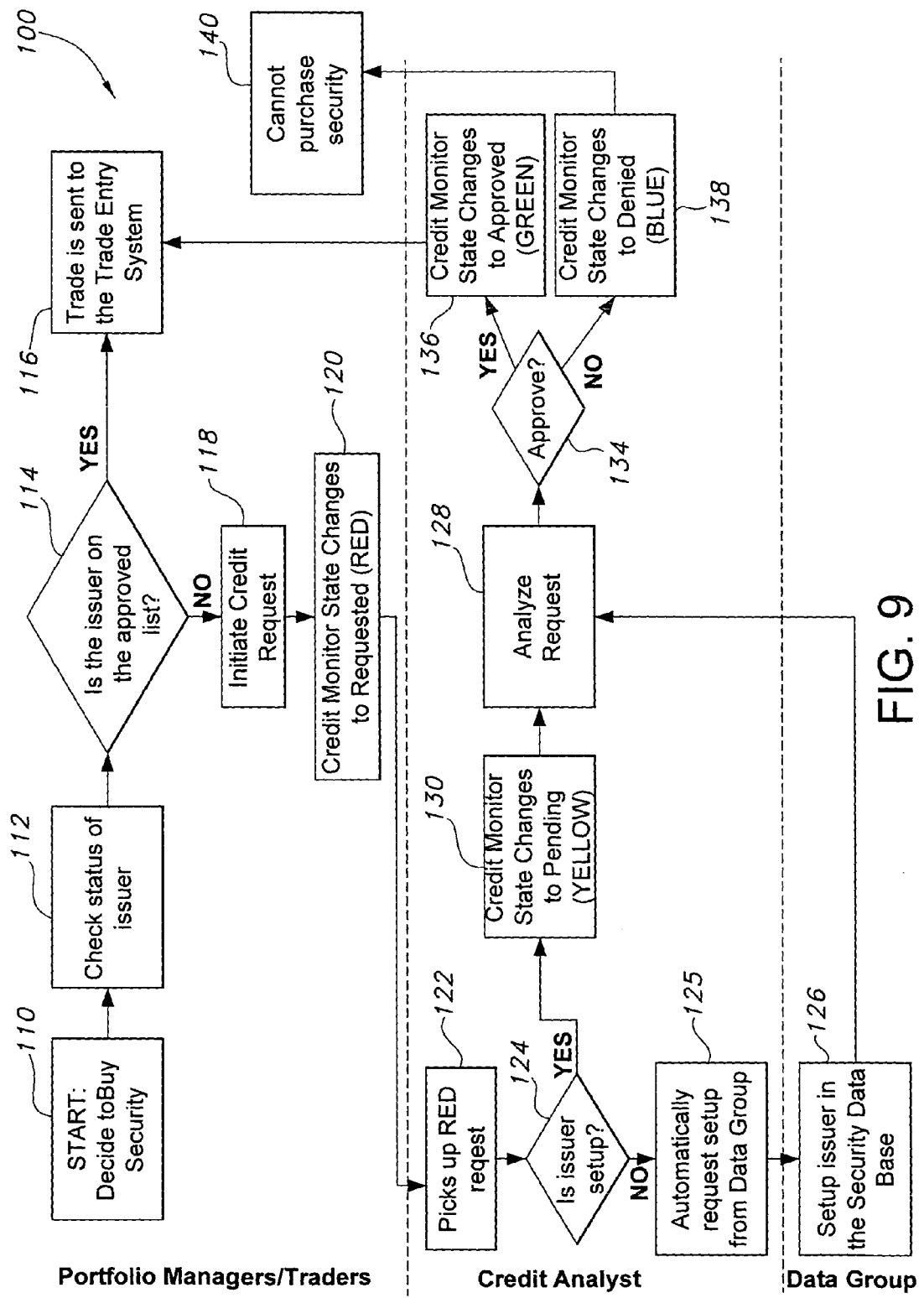
FIG. 9 is a flow chart depicting the steps in the pre-trade credit approval process of the subject invention.

Referring now to FIG. 9, there is illustrated a flow chart 100 depicting the steps in the pre-trade credit approval process of the subject invention. Ass illustrated, the process includes steps that are performed by three distinct parties, namely, the portfolio manager/trader, the credit analyst and the data group. Initially, at step 110, a portfolio manager/trader will decide to purchase a particular security, for example, a security issued by Kimberly-Clarke Corporation, for a portfolio contained within portfolio database 22. The portfolio has a set of compliance rules associated therewith, which are stored in rules database 24, and which provide guidelines for the purchase of securities. For example, the compliance rules may provide that securities can be added to the portfolio only if they are on the Primary and Tier I lists that are maintained by the credit management system of the subject invention.

Figure 10:
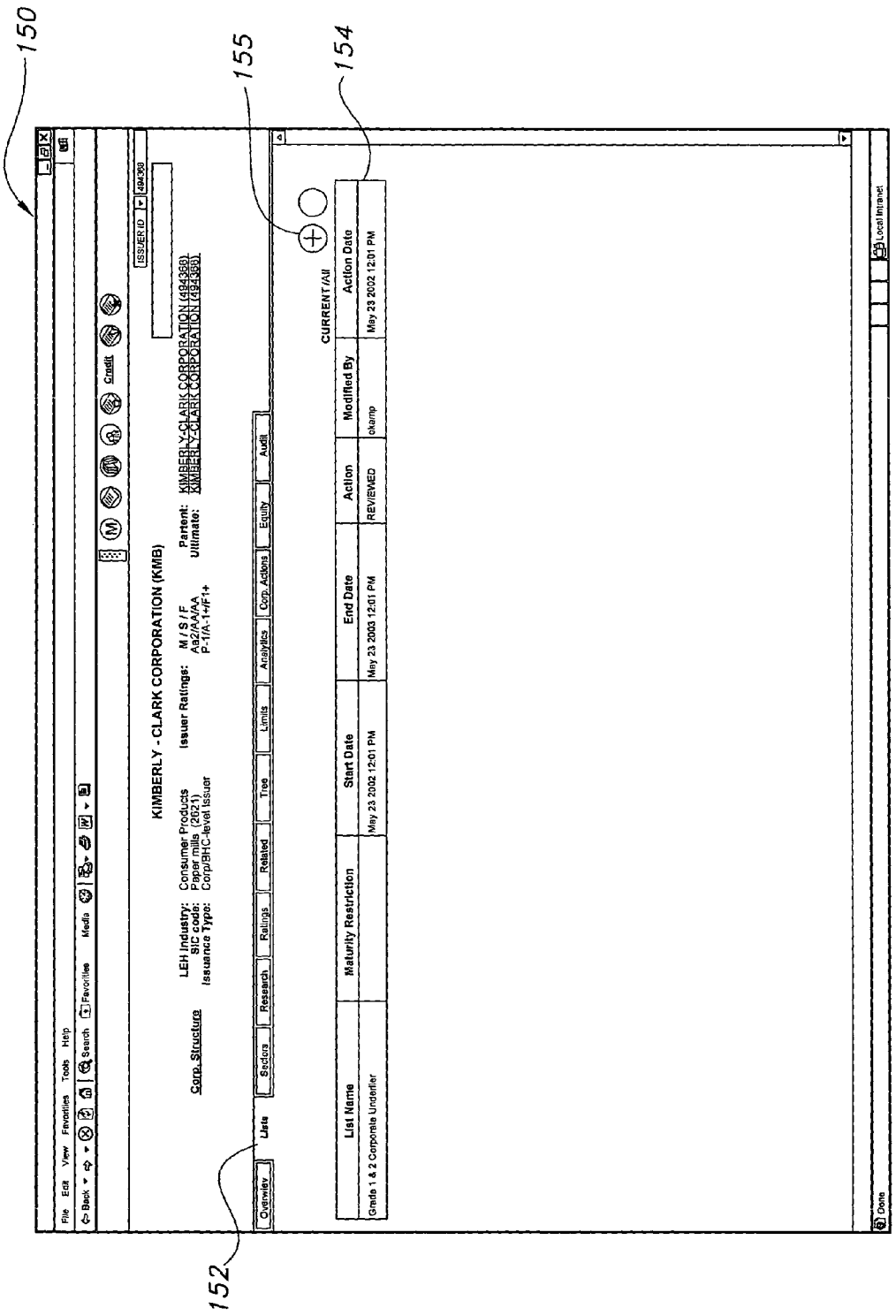
FIG. 10 is a depiction of a graphical user interface configured in accordance with a preferred embodiment of the subject invention that displays approved credit lists.

Accordingly, prior to purchasing a security using the trade entry system associated with the subject invention, the portfolio manger must check the list status of the issuer at step 112. This is accomplished, as shown in FIG. 10, by accessing graphical user interface screen 150 by way of selecting "Lists" tab 152. At such a time, a List table 154 displays the inclusive Lists under which the issuer of the securities sought to be purchased are maintained. Thus, at step 114, the portfolio manger may determine whether the issuer is maintained on a list that is in accord with the compliance rules of the portfolio.

If the issuer is on an approved list, then the portfolio manager may proceed to step 116, and send the trade to the trade entry system for execution. However, if, as in the case of the subject example, Kimberly-Clarke is only maintained under the Grade 1 & 2 Corporate Underlier list, as shown in table 154 of screen 150, the portfolio manager must initiate a credit approval request, because the compliance rules for the subject portfolio do not permit the purchase of securities that are maintained on this list. Therefore, at step 118, the portfolio manager requests credit approval for Kimberly-Clarke to be added to the Primary and Tier I lists, since they are approved by the compliance rules of the portfolio.

Figure 11:
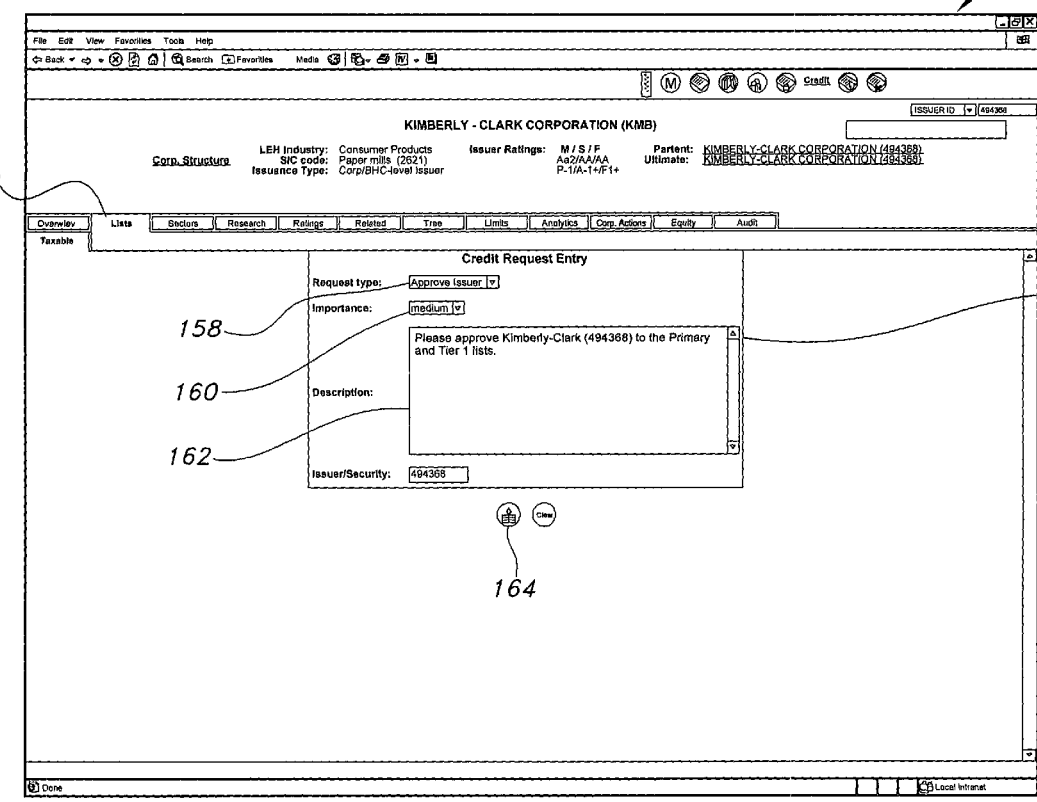
FIG. 11 is a depiction of a graphical user interface configured in accordance with a preferred embodiment of the subject invention that includes a data entry field for submitting a credit approval request for a selected issuer.

A credit approval request in made by selecting the icon 155 on screen 150 of FIG. 10. Thereupon, a credit request entry form 156 is displayed on screen 150 which includes, among other things, a data entry field 158 for designating the type of request (e.g., Approve Issuer), a data entry field 160 for designating the relative importance of the request (e.g., high or medium), and a data entry field 162 for setting forth a detailed textual statement describing the credit approval request, as shown in FIG. 11. Once the portfolio manager has completed request form 156, the request may be submitted to the credit analyst by selecting icon 164. Then, the request is broadcast to a credit analyst and is displayed in real-time on the Credit Monitor screen 170 depicted in FIG. 12. At this stage of the process 100, which is corresponds to step 120 in FIG. 9, the credit monitor displays the description of the request in the color Red, indicating that no action has been taken by the credit analyst.

At step 122, the credit analyst receives the credit approval request from the portfolio manager, and determines at step 124 whether the issuer is set up in the issuer database 26. That is, a determination is made as to whether the credit management system 10 of the subject invention includes information related to the issuer of interest. If the answer to this inquiry at step 124 is no, then the credit analyst will automatically request that the issuer be set up in the system at step 125. A person or group assigned to this task will then perform the steps necessary to set up the issuer in the system at step 126. Thereafter, the process will be placed back into the control of the credit analyst at step 128, whereupon, the request is analyzed based upon the subjective and objective information now stored in issuer database 26.

It is envisioned that during the period of time in which the issuer is being setup in the database at step 126, verbal approval may be given by the credit analyst to enable the portfolio manager/trader to proceed with the transaction, subject to specified restrictions. This verbal approval may be granted for a period of time, and expire automatically thereafter. An appropriate status message indicting a verbal approval would be displayed in the Credit Monitor screen 170, or in another location.

If the answer at step 124 is yes, that is, the issuer is set up in the system, then process 100 proceeds to step 130, whereupon the color-coded status of the credit approval request displayed in the Credit Monitor screen 170 is changed to Yellow. This color indicates that the status of the request is pending.

Figure 13:
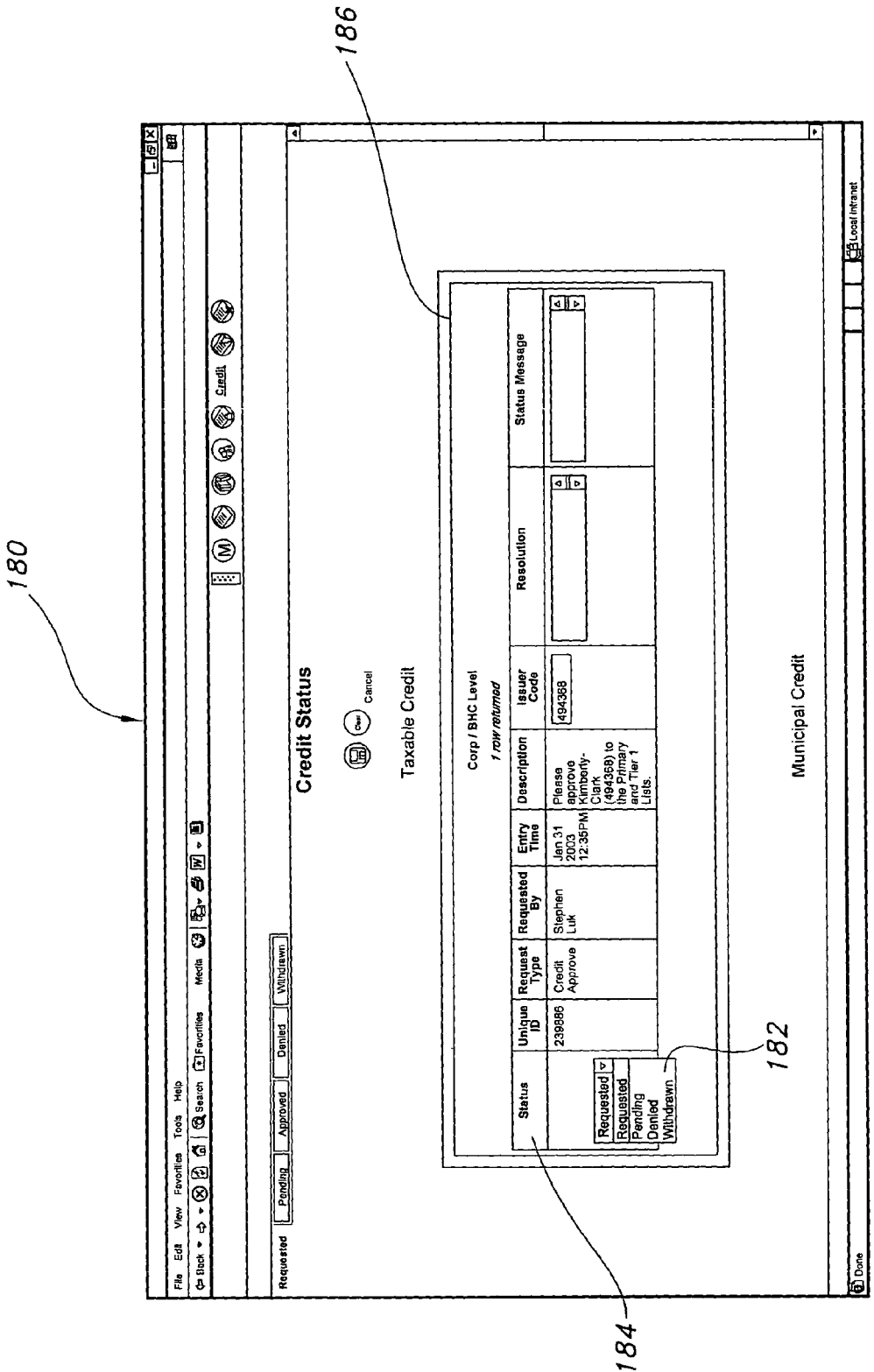
FIG. 13 is a depiction of a graphical user interface that enables an analyst to manage the status of the credit approval process, at an initial stage of the credit approval process.
Figure 14:
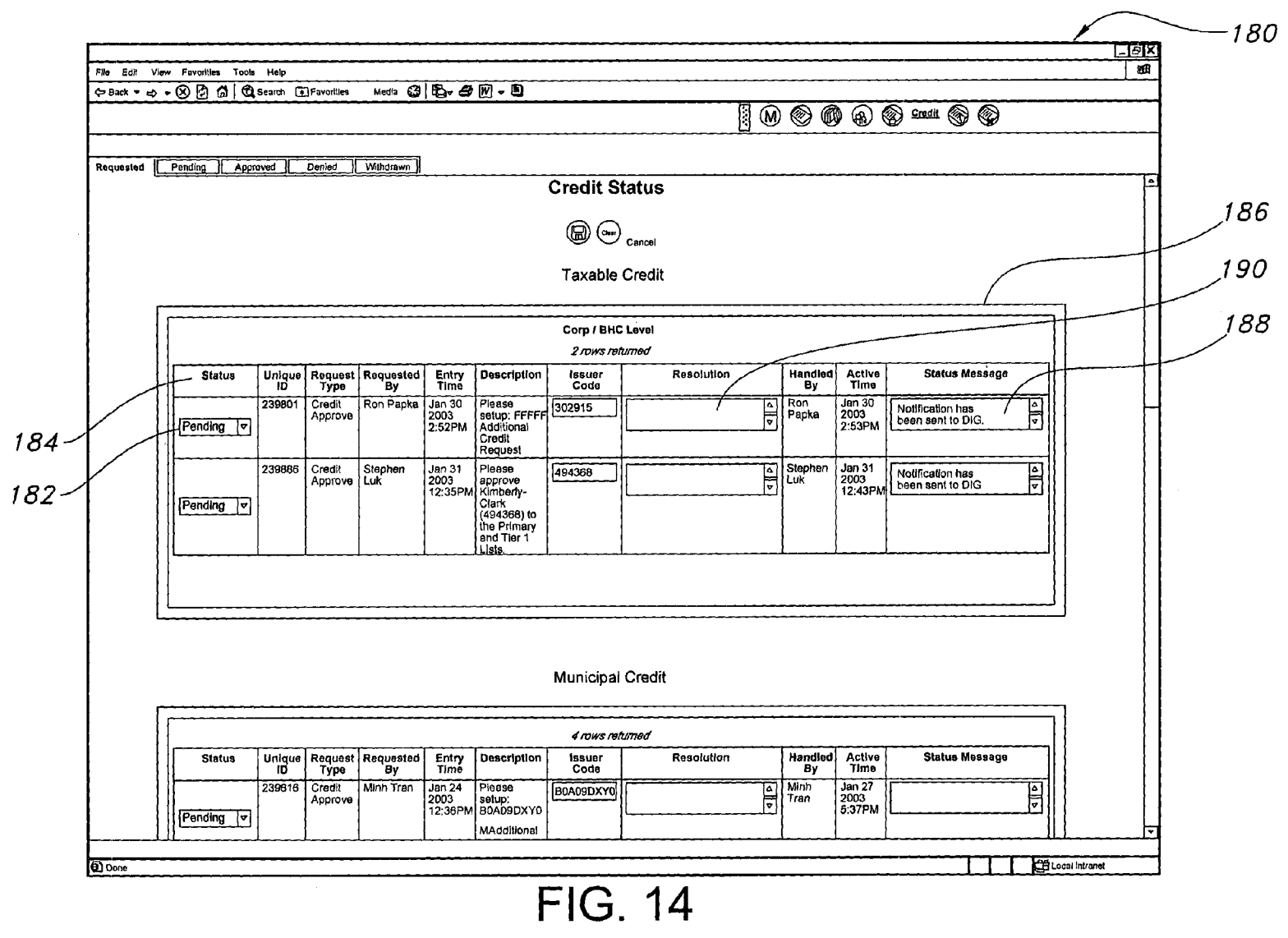

The credit analyst manages the credit approval process using the credit status screen 180 illustrated in FIG. 13. More particularly, using a pull-own menu 182 in the status column 184 of table 186, the analyst can selectively change the color-coded status of the request in Credit Monitor screen 170 by choosing between the following states: Requested, Pending, Denied, and Withdrawn. The credit status screen 180 also allows the credit analyst to manage the flow of information during the pendency of the request. For example, FIG. 14 illustrates the use of textual status messages in the status message field 188 of table 186. A resolution message field 190 is also provided on screen 180, which enables the credit analyst to present textual messages describing the resolution of the credit approval request on behalf of the portfolio manager.

With continuing reference to FIG. 9, at step 128 the credit analyst evaluates the credit worthiness of the issuer by using the information stored in issuer database 26 through the use of the graphical user interfaces shown in FIGS. 2 through 8. More particularly, the credit analyst will determine the credit risk associated with the issuer based upon the subjective and objective information stored in the issuer database 26. Once the evaluation is complete, the credit analyst will either approve or deny the request at step 134.

Figure 12:
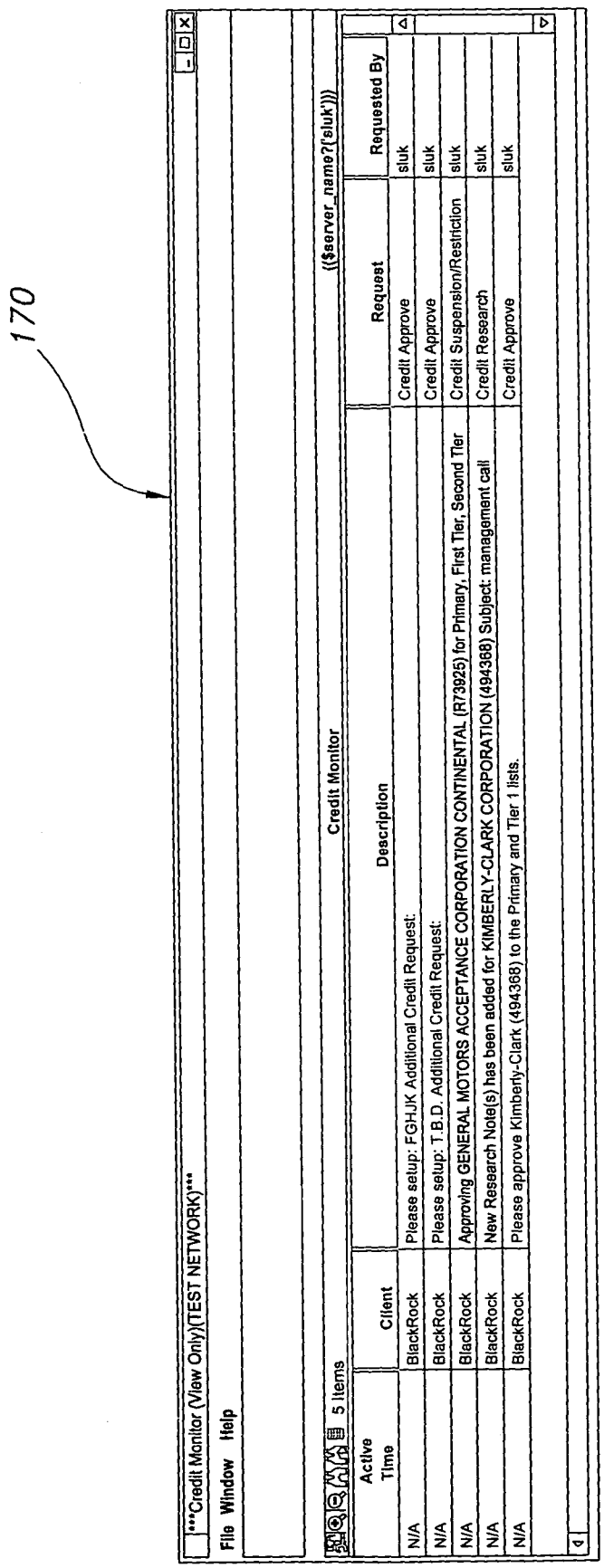
FIG. 12 is a depiction of a display screen that enables a portfolio manager to monitor the credit approval process through color-coded states.

If the request is approved, at step 136, the credit analyst changes the color-coded status message on monitor screen 170 of FIG. 12 to Green. This indicates approval of the request. If, on the other hand, the request is denied because of the credit risk involved, at step 138, the credit analyst changes the color-coded status message on monitor screen 170 of FIG. 12 to Blue. This indicates denial of the request. Consequently, at step 140, the portfolio manager will be unable to purchase the security for the subject portfolio, as this would be a purchase contrary to the investment objectives defined by the portfolio's compliance rules.

Figure 15:
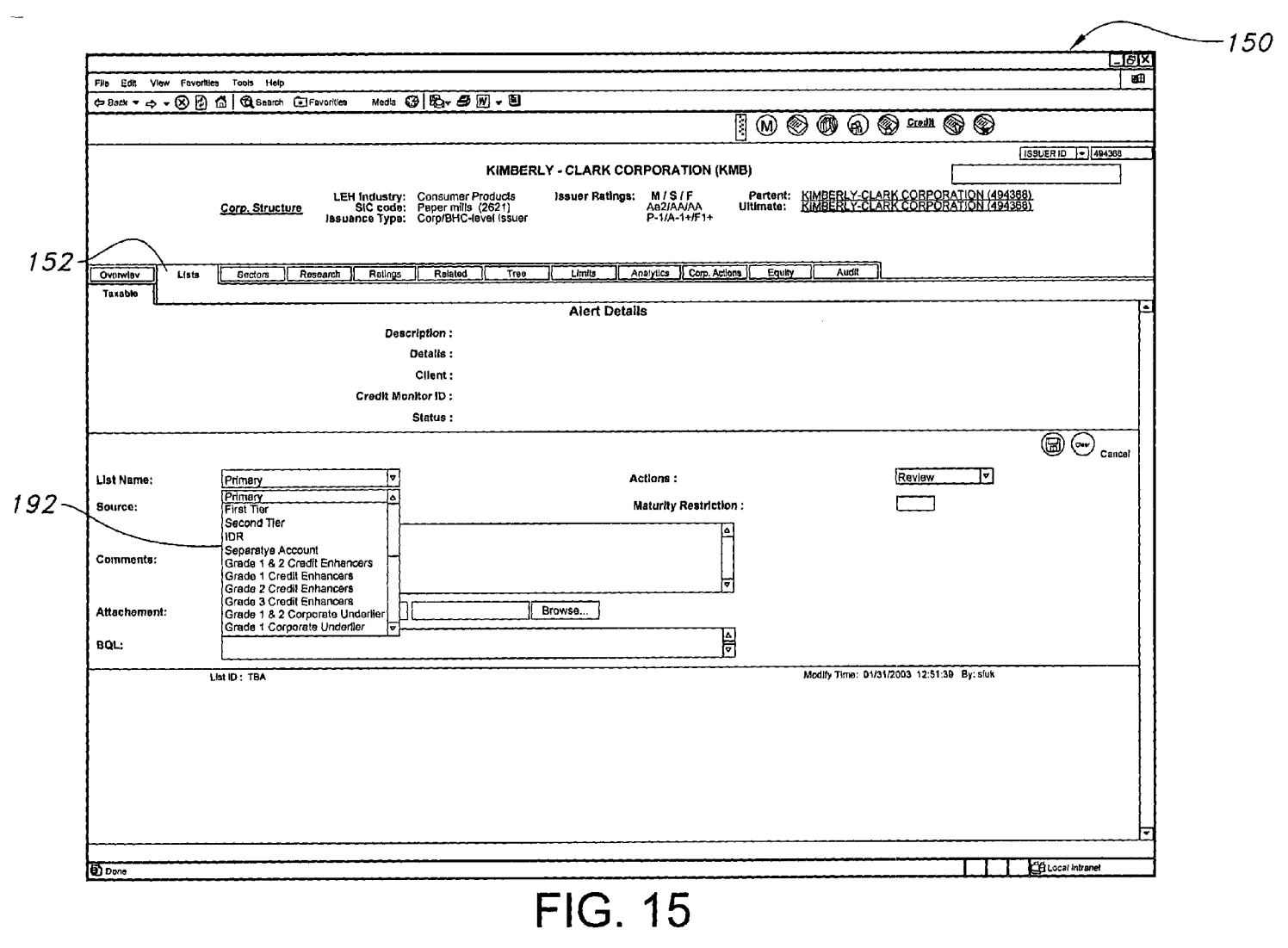
Figure 16:
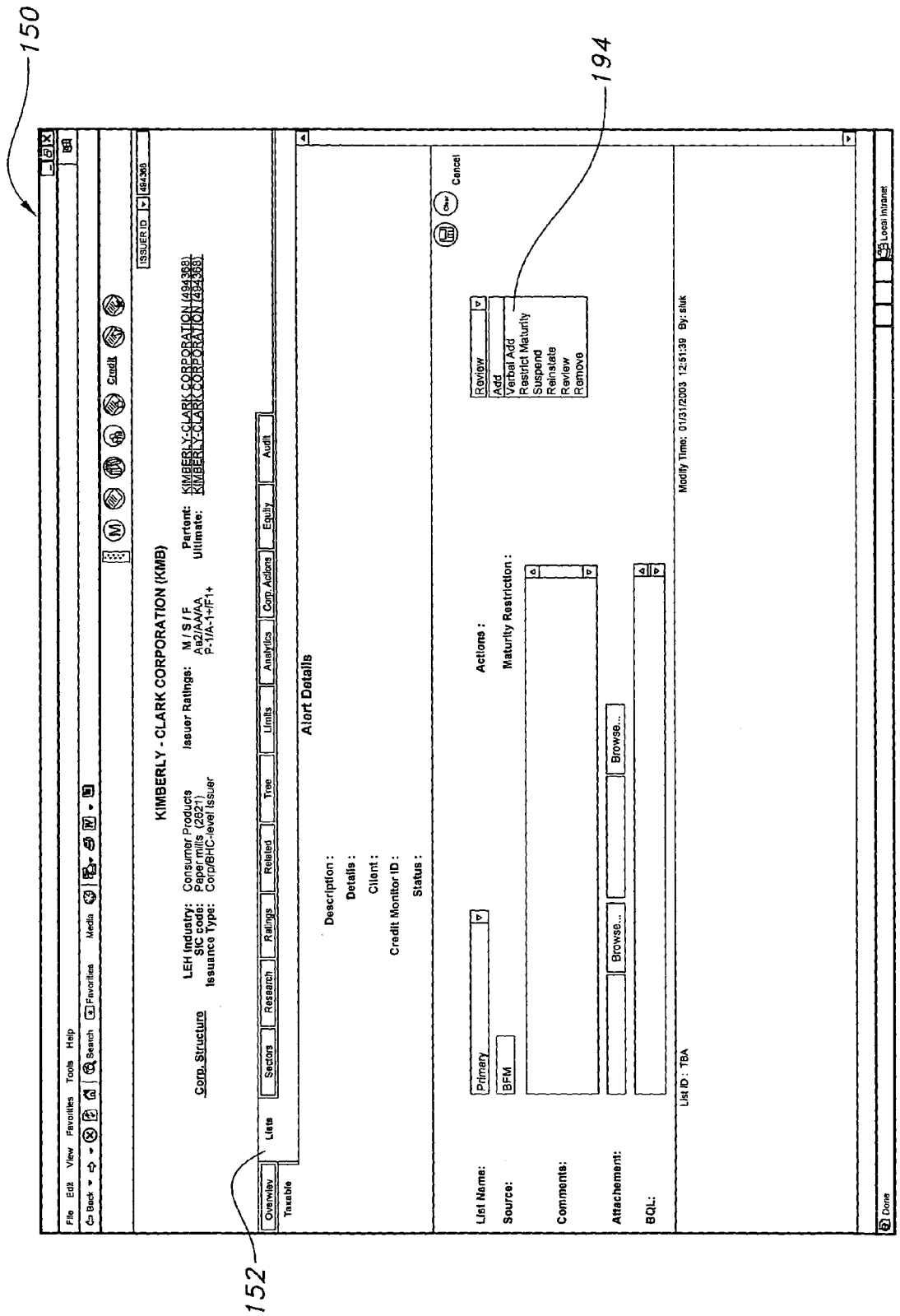
FIG. 16 is a depiction of the graphical user interface of FIG. 15 showing a pull down menu to enable an analyst to add an issuer to an approved credit list selected from a group of credit lists.

Upon approval of the request at step 134, the credit analyst selects the "Lists" tab 152 on the graphical user interface 150 of FIGS. 15 and 16, to add the issuer to the approved lists, which in this instance, are the Primary and Tier I lists. As illustrated in FIG. 15, the credit analyst resolves the request by first accessing the pull-down menu 192 to select the newly approved list(s) from a group of list names. Then, the credit analyst adds the issuer to an approved list by selecting pull-down menu 194 which contains a group of actions including:

Add, Verbal Add, Restrict Maturity, Suspend, Reinstate, Review and Remove. This screen is also configured to permit the credit analyst to append comments and attach documents to the credit approval.

Figure 18:
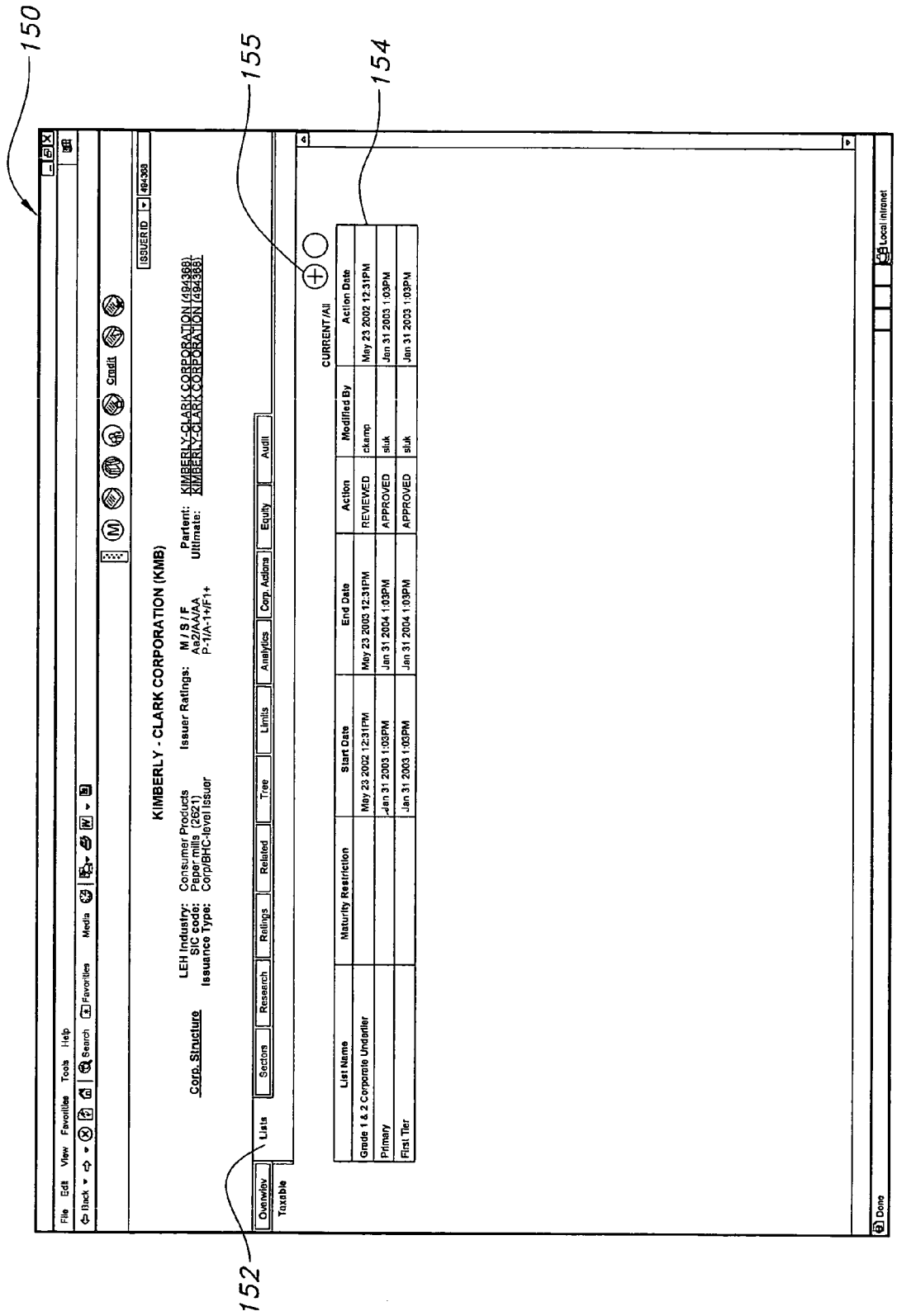
FIG. 18 is a depiction of the graphical user interface of FIG. 10 showing the two new credit lists to which the issuer has been added.

It is also possible for the credit analyst to add an issuer to multiple lists by accessing table 196 shown in FIG. 17. In this instance, the credit analyst can apply an action to multiple lists names by selecting a box in the "Apply ?" column 198 of table 196. Once the credit analyst adds an issuer to one or more approved lists using either screen of interface 150, the list name will appear in List table 154, as depicted in FIG. 18. As noted in the table, the actions taken with respect to the lists include "Reviewed" with respect to the initial Grade 1 & 2 Corporate Underlier lists and "Approved" with respect to the Primary and First Tier lists.

The credit risk management system of the subject invention is also adapted and configured to enable the credit analyst and/or portfolio manager to query historical actions performed in the system to determine the status of certain issuers with respect to a selected list name. For example, a credit analyst can determine which issuers have been suspended from the Tier I list, when such actions occurred and which credit analyst conducted the credit evaluation. Historical queries can be based on list name, action, issuer name or date.

The subject system is also adapted and configured to enable a credit analyst or portfolio manager to perform list queries to obtain all or a portion of the taxable or tax-exempt issuers in a particular list of approved issuers. The subject system is further adapted and configured to enable a credit analyst or portfolio manager to access a credit list matrix or spreadsheet, which summarizes approved taxable and tax-exempt issues.

Figure 19:
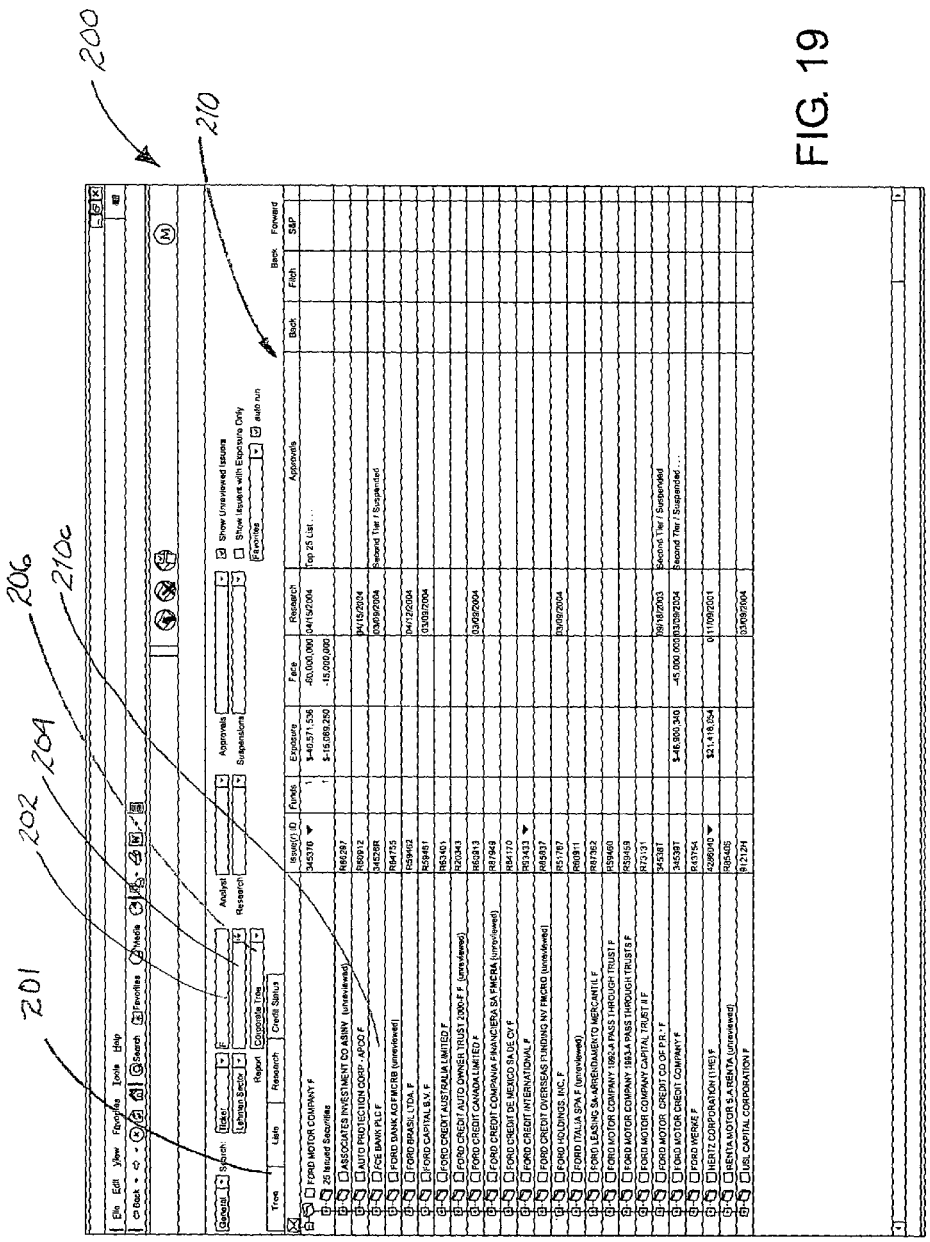
FIG. 19 is a graphical user interface configured in accordance with another preferred embodiment of the subject invention that enables a credit analyst to load issuer data based on specified search criteria, to evaluate credit risk associated with issuers of securities based on subjective research notes;.

Referring now to FIG. 19, there is depicted a graphical user interface configured in accordance with another preferred embodiment of the subject invention and designated generally by reference numeral 200. Graphical user interface 200 enables a credit analyst to load issuer data, based on specified search criteria. The issuer data allows the credit analyst to evaluate credit risk associated with issuers of securities using subjective research notes and other related information, which is stored in one or more relational databases.

In particular, a credit analyst loads issuer data into graphical user interface 200 by entering either a ticker symbol in field 202 and/or an industry sector in field 204. In the instant example, the ticker symbol "F" is entered in field 202 to load issuer data relating to Ford Motor Company. Examples of industry sectors include commonly referenced Lehman sectors such as automotive, aerospace, banking, etc. The credit analyst also enters the format for the presentation of the issuer data, by entering a report format in field 206. In this instance, the selection "Corporate Tree" is entered in field 206, which causes the requested issuer data to be presented based upon the familial relationship of the selected corporate entities. Alternative report formats are also available.

FIG. 19 shows a table 210, accessed by way of "Tree" tab 201, which contains issuer data for the Ford Motor Company, in a corporate tree format. Table 210 includes, among other things, Issue(r) ID data, publication dates of subjective research notes, and approval list information. Once this issuer data is loaded, a credit analyst (or portfolio manager) can easily locate and review research notes stored in the issuer database, or add new research notes to the database for a specific issuer or security, for a corporate tree or for an entire industry sector, in several different ways.

Figure 20:
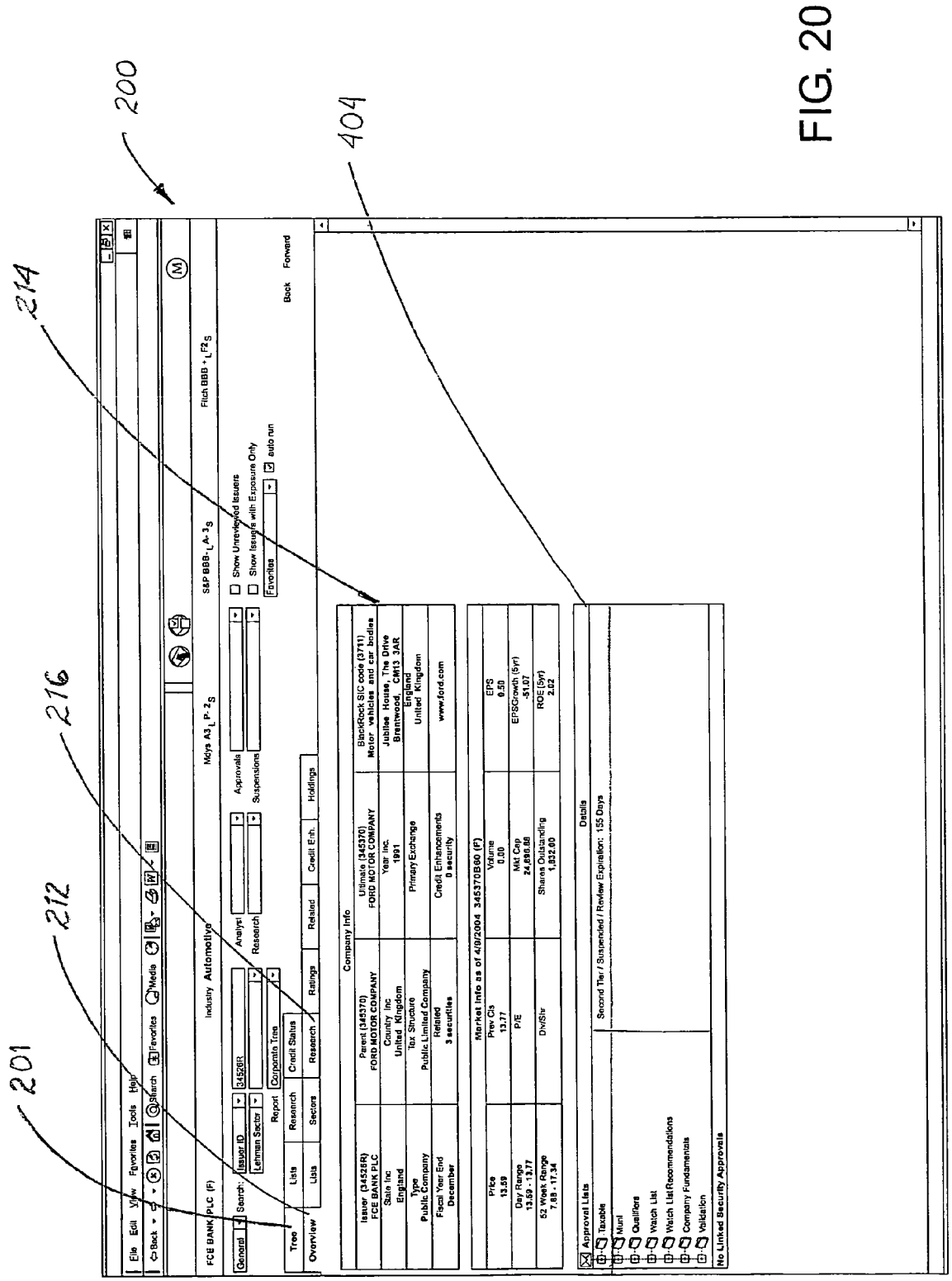
FIG. 20 shows the graphical user interface of FIG. 19 with tables containing a detailed overview of company and market financial information related to an issuer, and an approval lists table.

By way of example, to add a new research note for a specific issuer or security, the user clicks on or otherwise selects a specific issuer from the corporate tree in table 210, such as "FCE Bank PLC" at line 210c of table 210. In doing so, the "Overview" sub-tab 212 is opened for the selected issuer, as illustrated in FIG. 20. This action reveals a table 214 of detailed company information and market information as of a particular date. The credit analyst or portfolio manager may use this information to evaluate credit risk for an issuer. In addition, an "Approval Lists" table 215 is presented, which will be discussed in greater detail hereinbelow with respect to another aspect of graphical user interface 200.

Figure 21:
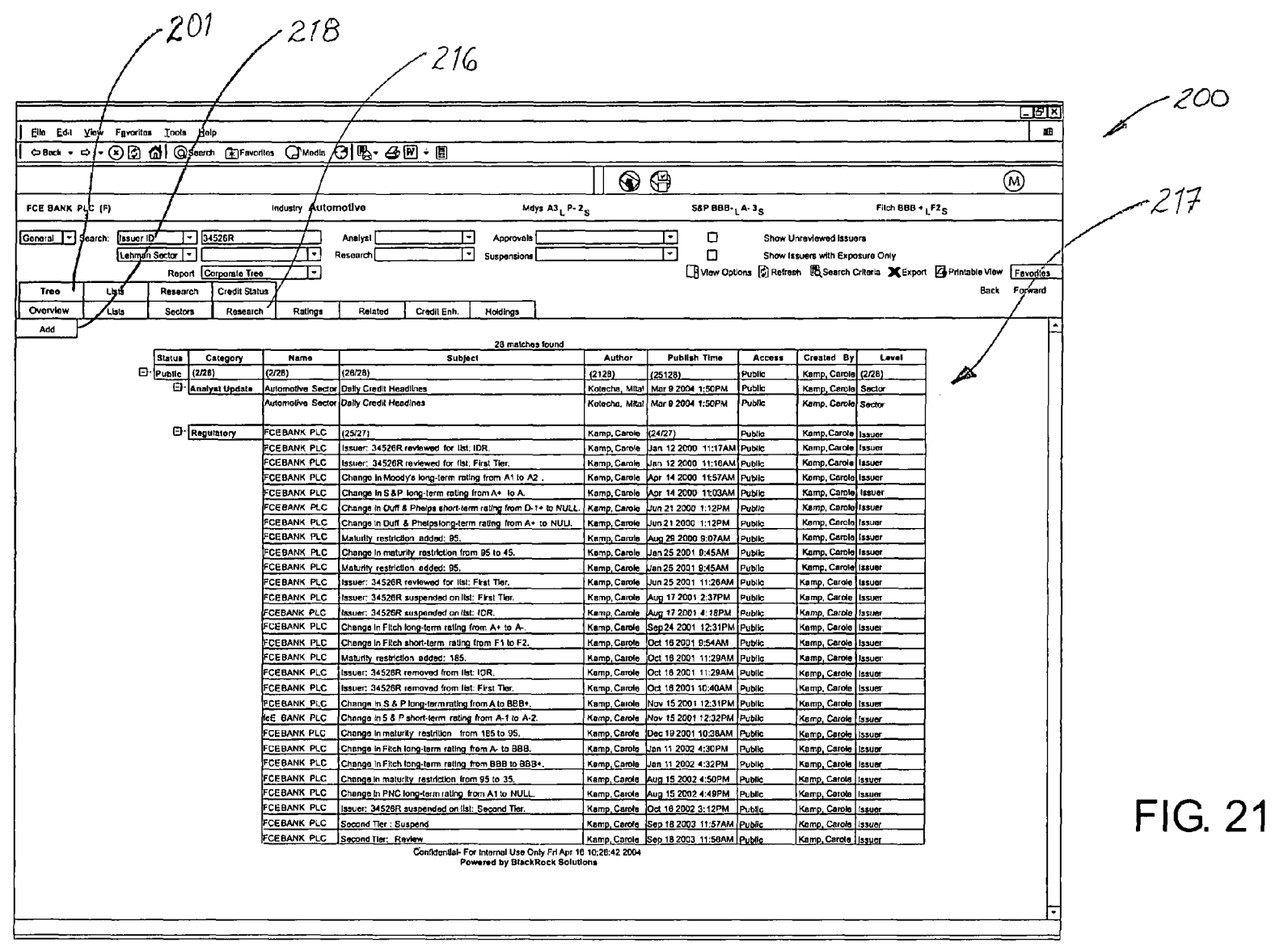

From table 214, the selection of "Research" sub-tab 216 opens a table 217 that provides a list of research notes, best seen in FIG. 21. Table 217 presents, among other things, the subject, author, and time of publication for each research note found in response to the user selected search criteria. In this case, 28 research notes were found in response to the search criteria. For example, as shown in table 217, on Mar. 9, 2004, a research note was published regarding "Daily Credit Headlines."

Figure 22:
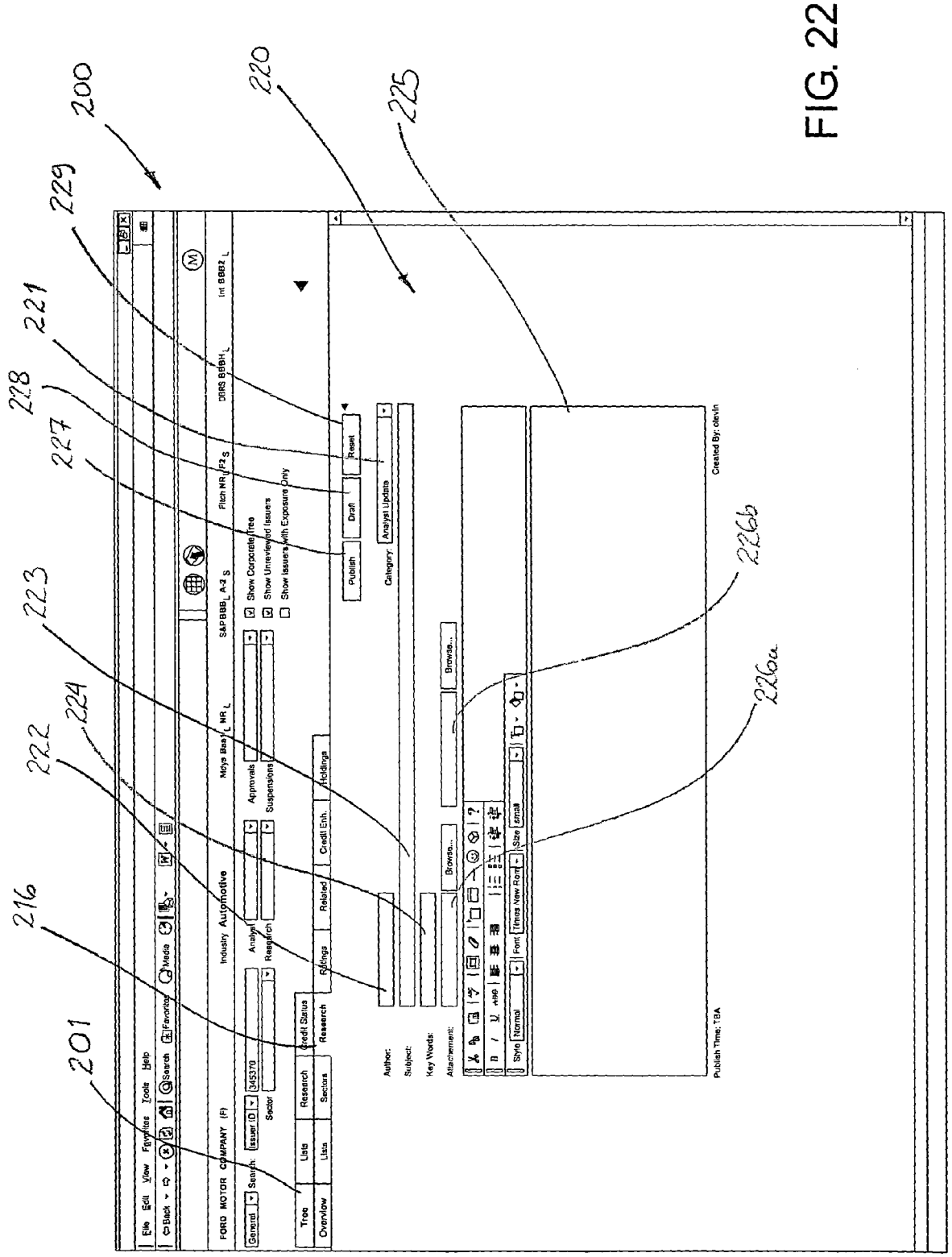
FIG. 22 shows the graphical user interface of FIG. 19 with a data form that includes data entry fields for enabling a credit analyst to add a new research note.

The research notes in table 217 are separated or organized by category. For example, table 217 provides analyst updates and regulatory research notes. Other categories include management updates and research reports. By selecting the "Add" tab 218 at the upper left hand corner of the graphical user interface 200, as shown in FIG. 21, a data form 220, which is shown in FIG. 22, is accessed. Data form 220 enables a credit analyst to add a new research note to the issuer database.

Data form 220 includes a data field 221 for selecting or otherwise specifying the category of the new research note, and several other data entry fields, including data field 222 for entering the authors name, data field 223 for entering the subject matter of the research note, data field 224 for entering key words to facilitate an effective search. A data field 225 is provided for entering the analyst comments, which form the sum and substance of the research notes. In addition, data form 220 enables the user to search for and create attachments to the research note by entering data in fields 226a and 226b. Examples of attachments may include published articles or corporate reports. Once the research note is completed, the user may publish the note by selecting "Publish" tab 227. This action will store the note in the issuer database and enable direct access thereto from graphical interface 200 in a number of different ways. Alternatively the user may treat the new research note as an unpublished draft by selecting tab 228 or reset the fields of data form 220 by selecting tab 229.

Figure 23:
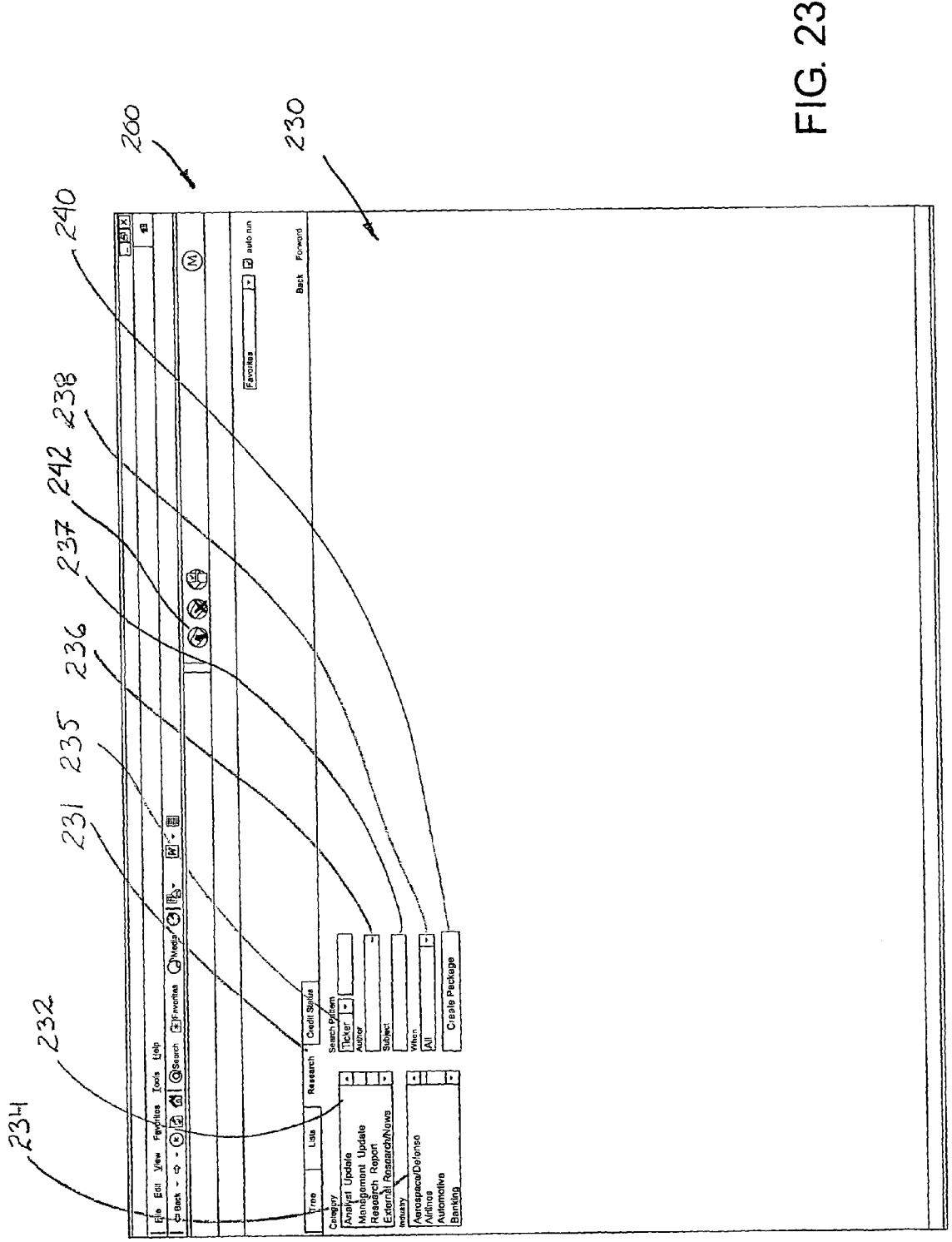
FIG. 23 shows the graphical user interface of FIG. 19 with a data form that includes data entry field for enabling a credit analyst to locate specific research notes and create research reports based on user specified search criteria.

By way of example, a specific research note or a plurality of research notes can be accessed, retrieved or otherwise located using the research note search form 230 illustrated in FIG. 23. Search form 230 is accessed from the main "Research" tab 231 of graphical user interface 200, and includes user selectable menu 232 for designating an industry sector for a search and user selected menu 234 for designating a category for a search. Search form 230 further includes data fields 235, 236, 237 and 238, that permit a credit analyst or portfolio manager to more specifically define the scope of a search by entering the ticker symbol, author, subject matter and publication date range for the research note sought, respectively. In addition, the user can create a report containing each of the research notes accessed by search form 230, by selecting the "Create Package" tab 240. Once search form 230 has been completed, selection of the "Retrieval" icon 242 serves to obtain the sought after research notes. The results would be similar in form to table 217 shown in FIG. 21.

Figure 24:
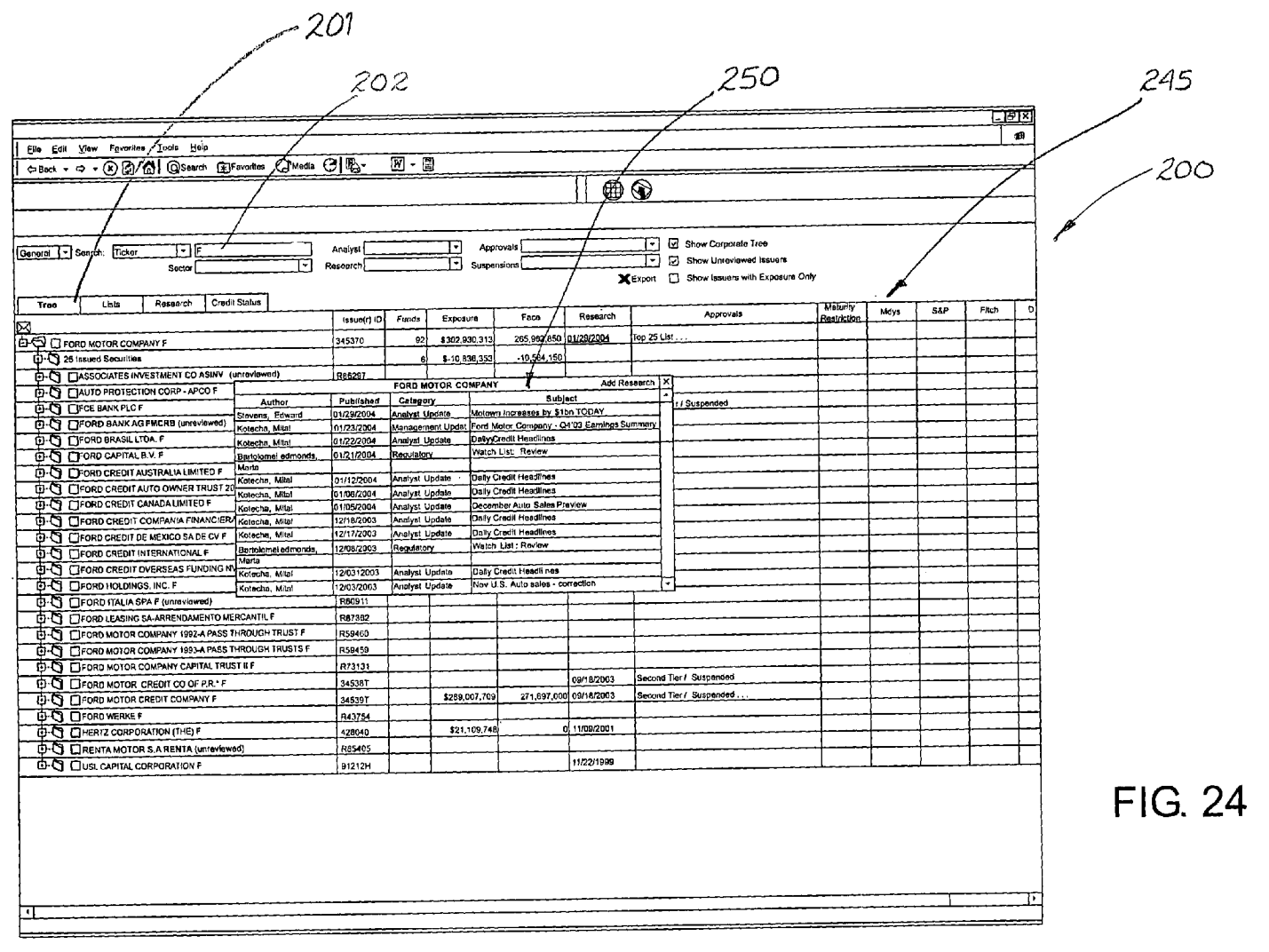
Figure 25:
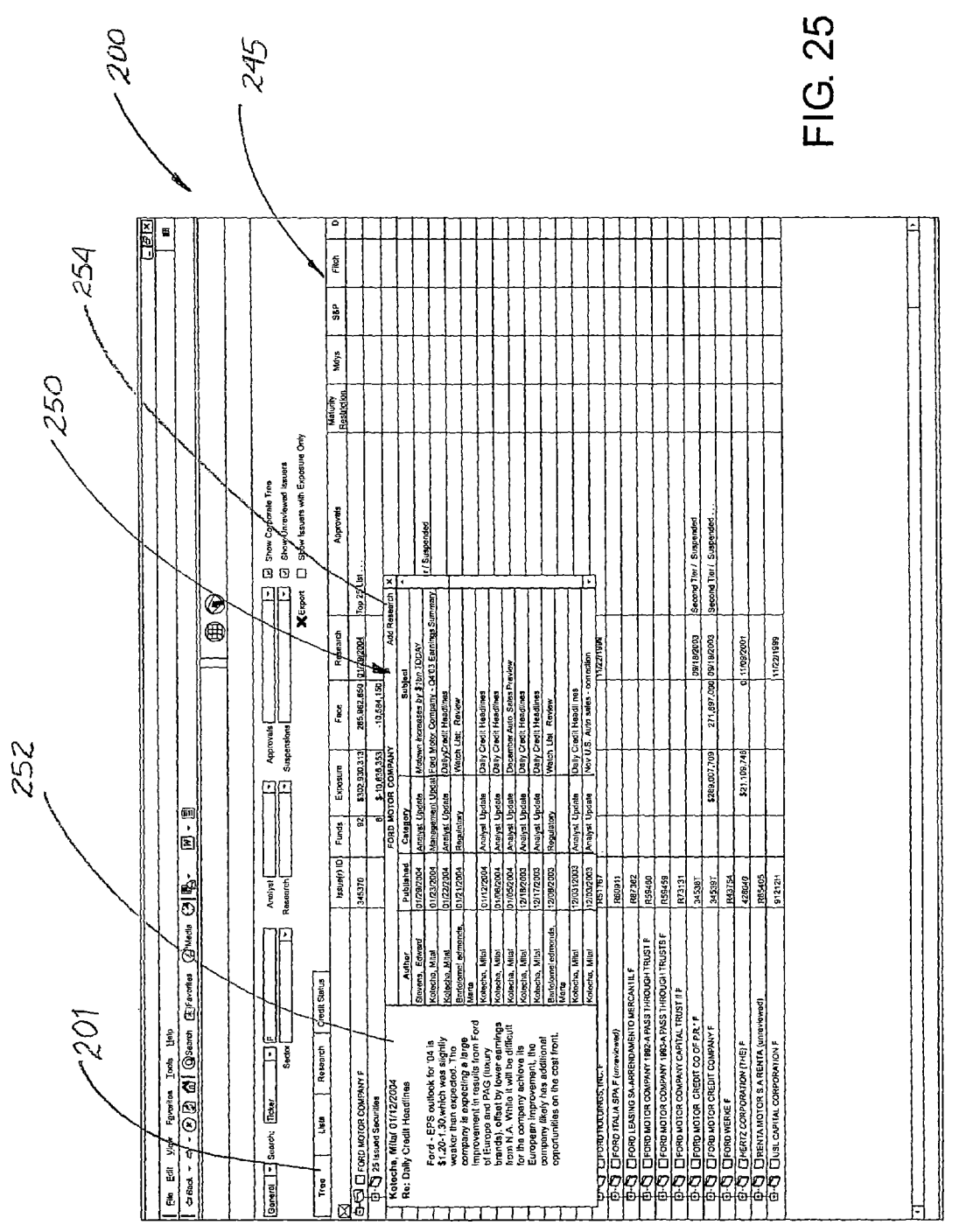

Referring to FIGS. 24 and 25, there is illustrated another method for accessing retrieving or otherwise locating specific research notes for use in evaluating credit risk. In particular, as shown in FIG. 24, clicking or otherwise selecting a publication date data link in the research column of table 245 accesses a list of research notes for a particular issuer. By way of example, selection of the publication date "Jan. 29, 2004" in the first row of table 245 reveals a pop-up window or table 250 containing a list of research notes beginning with the selected research note. User selection of a subject matter data link for a specific research note in window 250, for example, "Daily Credit Headlines," which appears in the sixth row of table 250, causes that research note from "Jan. 12, 2004" to be displayed in an adjacent window 252, in its entirety, as best seen in FIG. 25.

Figure 26:
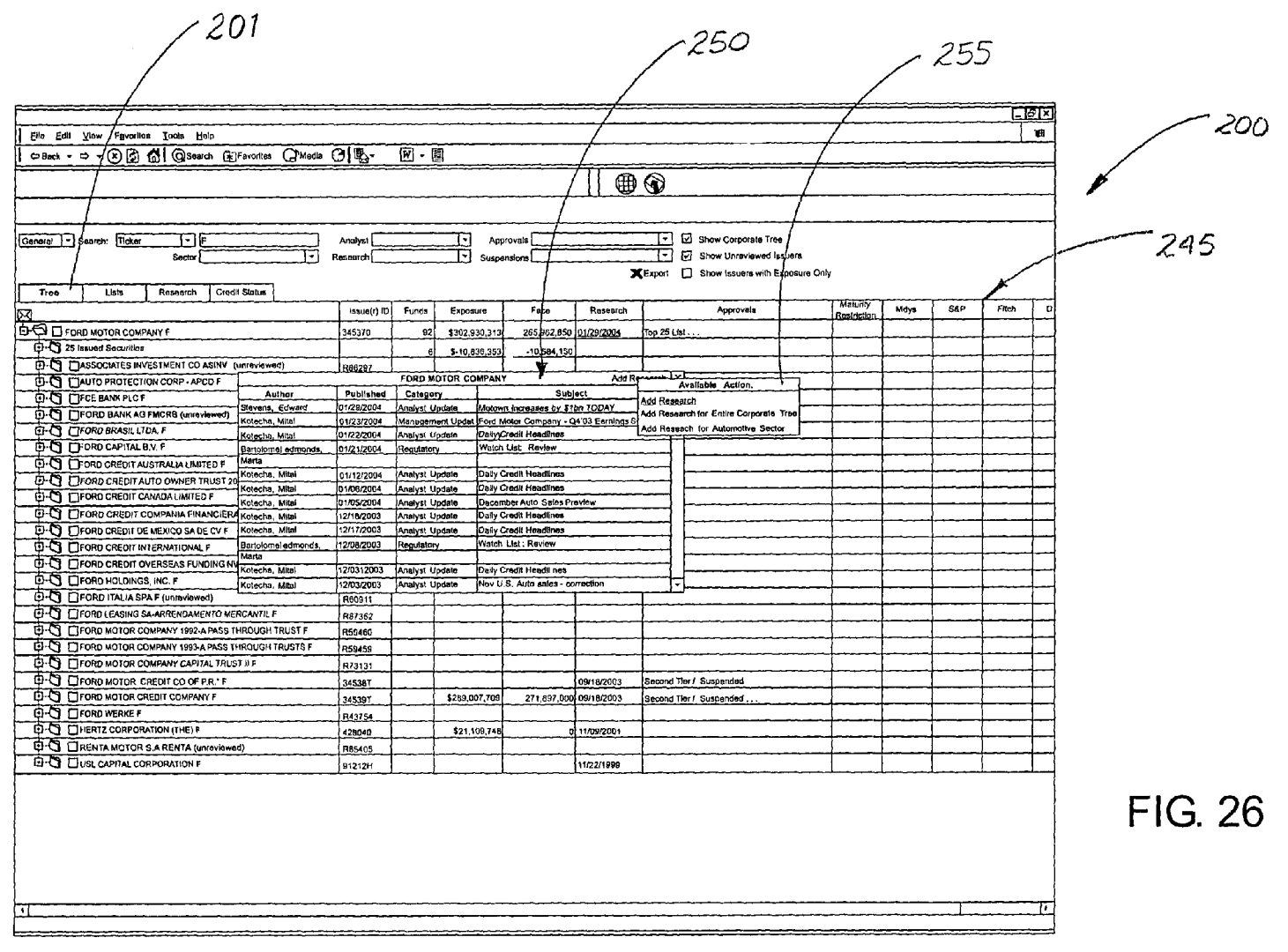

The methodology employed in FIGS. 24 and 25, to access and retrieve research notes can also be applied to add new research notes to the issuer database for a specific issuer, security, corporate tree or an entire industry sector. In particular, by selecting the "Add Research" data link 254 in the upper right hand corner of window 250, an "Available Actions" menu 255 is revealed, which is best seen in FIG. 26. Menu 255 enables a credit analyst to add a new research note individually, by corporate tree or by industry sector. Upon selection of one of the options in menu 255, the user will be forwarded to data form 220. Once completed, the new research note will be added to the database for the issuer of interest, the entire corporate tree or the sector of interest, depending upon the previous menu selection.

Figure 27:
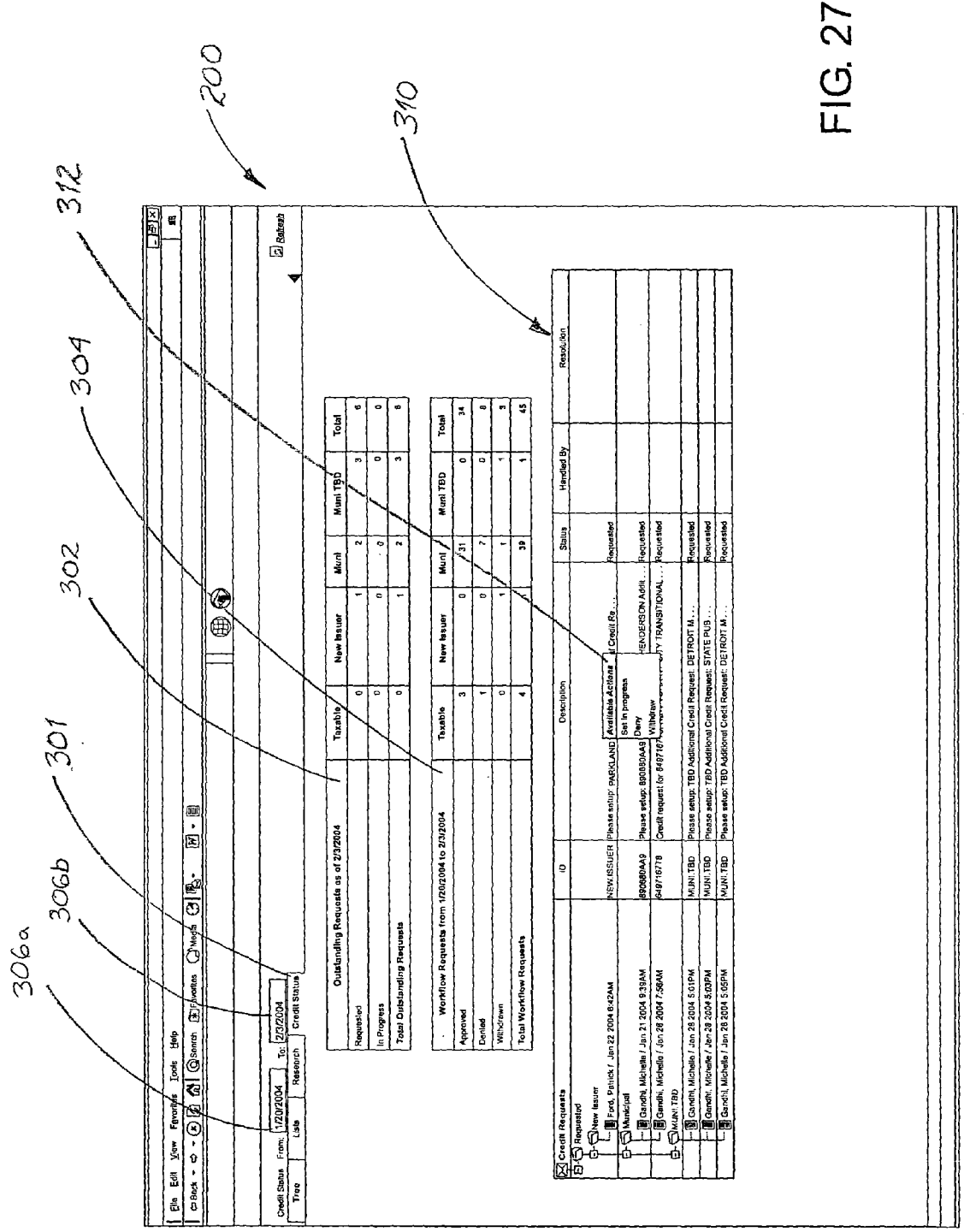
FIG. 27 shows the graphical user interface of FIG. 19 with an outstanding requests table, a workflow requests table and a credit approval request status table.

Referring now to FIG. 27, there is illustrated another feature or aspect of the graphical user interface 200 of the subject invention, which is accessed through the "Credit Status" tab 301. This feature enables a credit analyst or portfolio manager to monitor or otherwise manage credit approval requests in an efficient and convenient manner. In particular, this feature of graphical user interface 200 provides an outstanding requests table 302 and a workflow requests table 304. Tables 302 and 304 are populated with numerical data relating to credit approval requests for taxable issuers, new issuers and municipal issuers based upon user specified search criteria. Specifically, a user enters a date range in data fields 306a and 306b. As a result, the outstanding request table 302 provides numerical summary data relating to all outstanding requests as of a user specified date. In particular, table 302 identifies the number of approvals "Requested" and "In Progress." Similarly, the workflow request table 304 provides numerical summary data relating to all workflow requests during the user specified period. Table 304 identifies the number of requests that have been "Approved", "Denied" or "Withdrawn".

Information about specific credit approval requests is accessed by clicking or otherwise selecting a description based data link (e.g., Requested) or a numerical based data link (e.g., 3) located within either table. Access of information through a specific data link reveals a Credit Requests table 310, which lists information relating to all selected credit requests, including, among other things, issuer ID, description, and status of a particular request. For example, the first entry in table 310 of FIG. 27 indicates that a credit approval request was submitted on Jan. 22, 2004 for Parkland Finance Corp., which is a new issue.

Figure 28:
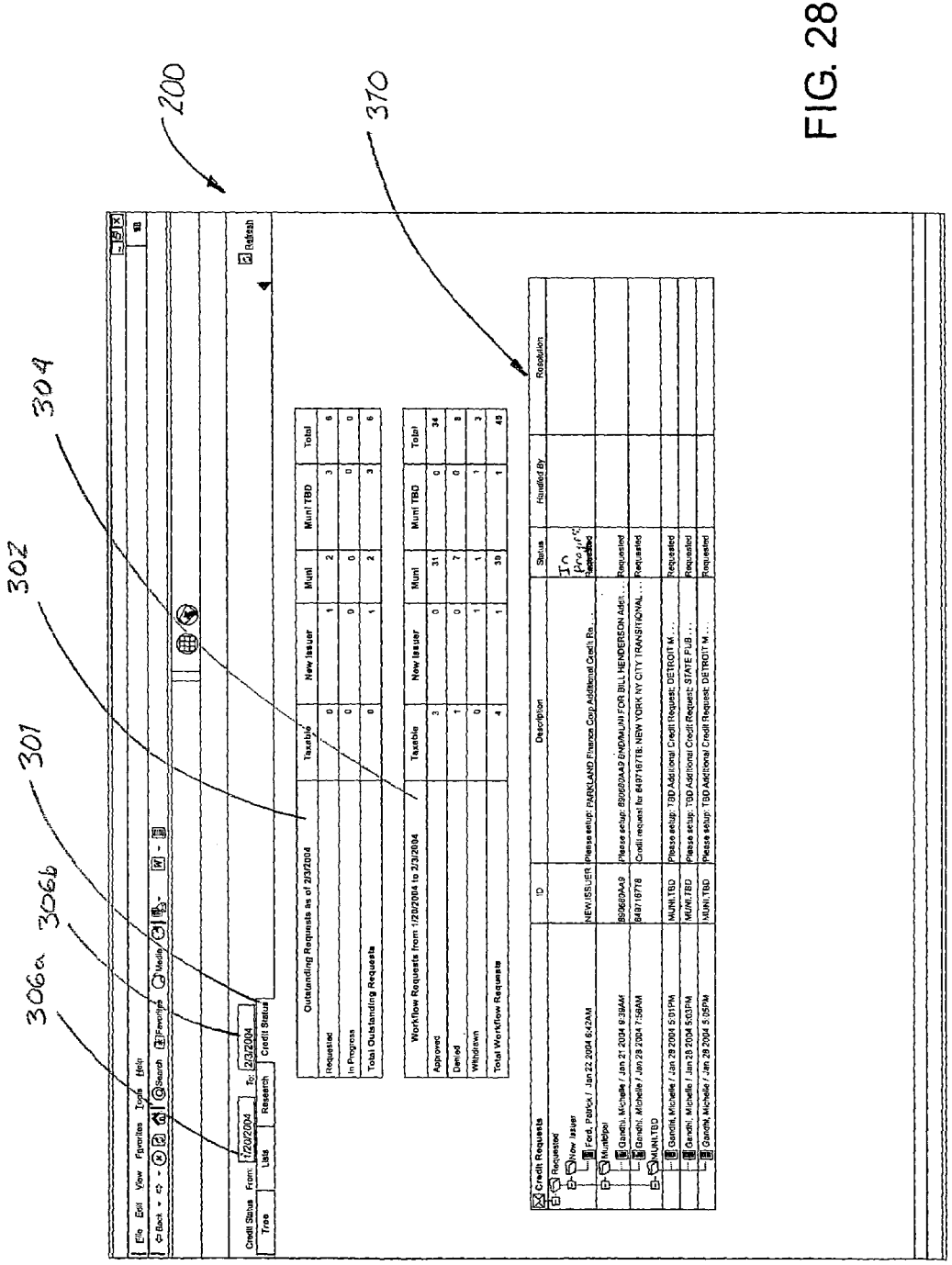
FIG. 28 shows the graphical user interface of FIG. 19, as depicted in FIG. 27, where the status of a selected credit request has been changed from "Requested" to "In Progress"

A credit analyst can change the status of any outstanding request or workflow request in tables 302, 304 that has been previously retrieved. This is done by selecting an option from the available actions menu 312, shown in FIG. 27, which is accessed through selection of a text data link (e.g., description or status) in table 310. For example, a user can change the status of a selected credit request from "Requested" to "In Progress" by selecting the "Set In Progress" option of menus 312. FIG. 28 illustrates the change in workflow status in table 310 that results from such a selection, as applied to the new credit approval request for Parkland Finance Corp.

Figure 29:
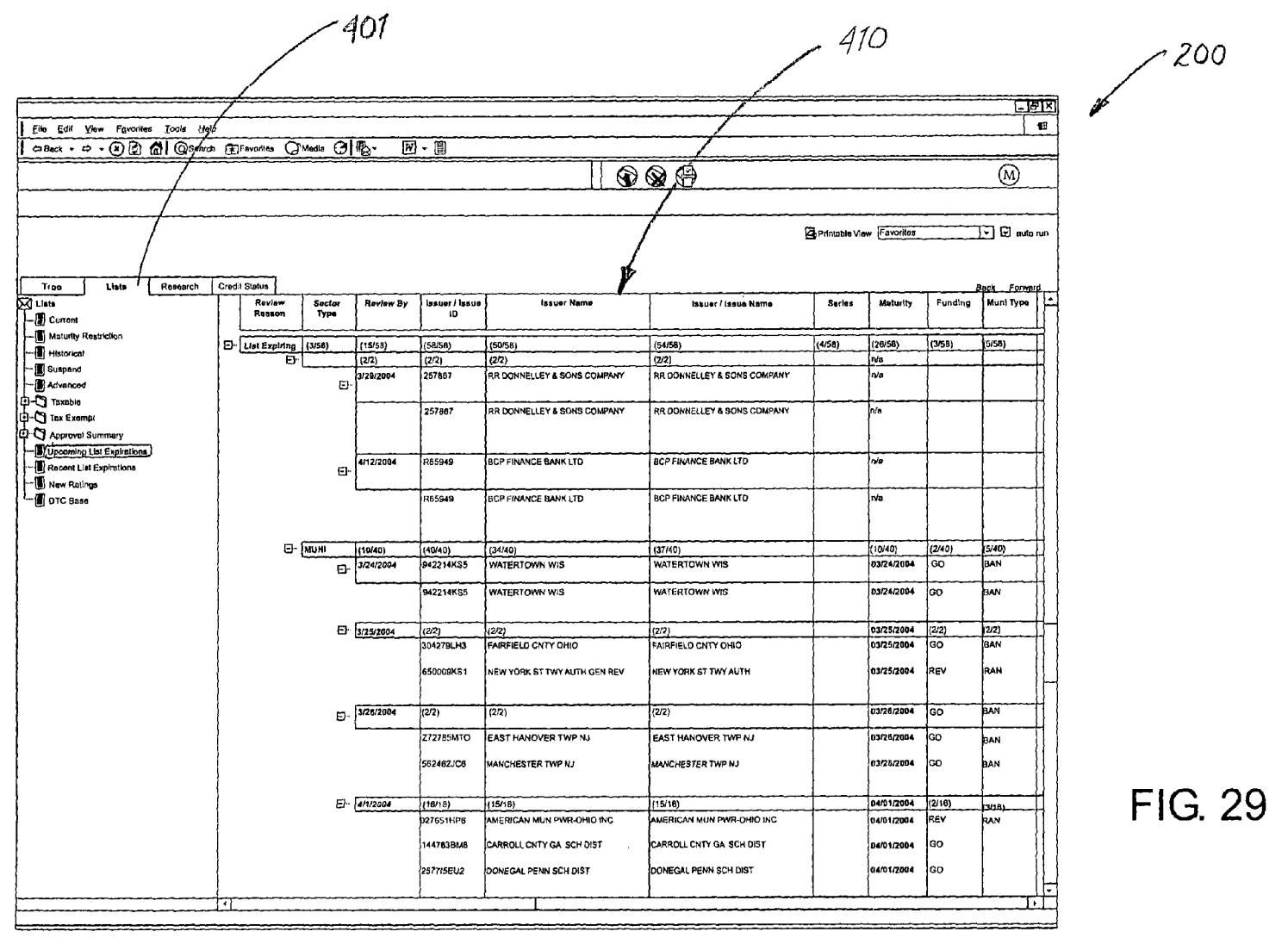

Referring now to FIG. 29, there is depicted another feature or aspect of the graphical user interface 200 of the subject invention, which is accessed through the main "Lists" tab 401. Here, user interface 200 enables a credit analyst to load and review, among other things, upcoming approval list expirations that are stored in the issuer database. More particularly, by way of list expirations table 410, a credit analyst can locate and review issuers approaching required review dates (e.g., within 30 days of expiration). The analyst can then request further approval for the issuer. Once reviewed and approved, the issuer expiration date changes to a client-defined time period. In the absence of such a time period, the expiration date will change to a default period, such as, for example, 366 days.

To review an expiring issue/issuer, the user clicks on or otherwise selects an issuer/issue ID data link from the expiration list in table 410. For example, a user may select "RR Donnelly & Sons Company." Then, through the "Overview" sub-tab 212, the user accesses the approval lists table 404 shown in FIG. 30 (see also FIG. 20). This table includes expiration information relating to the issuer of interest, including the number of days until expiration occurs with respect to a particular approval list.

Figure 30:
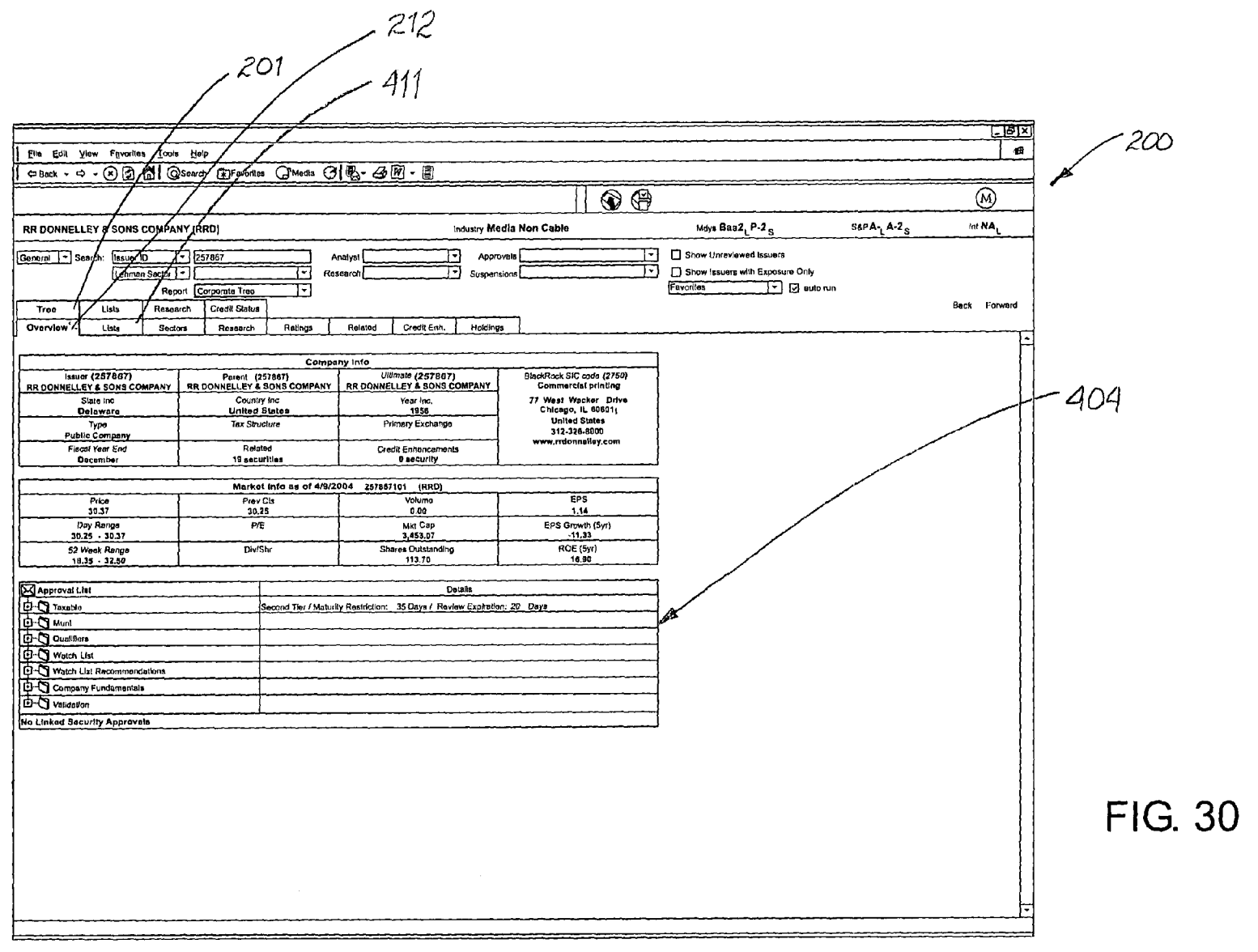
Figure 31:
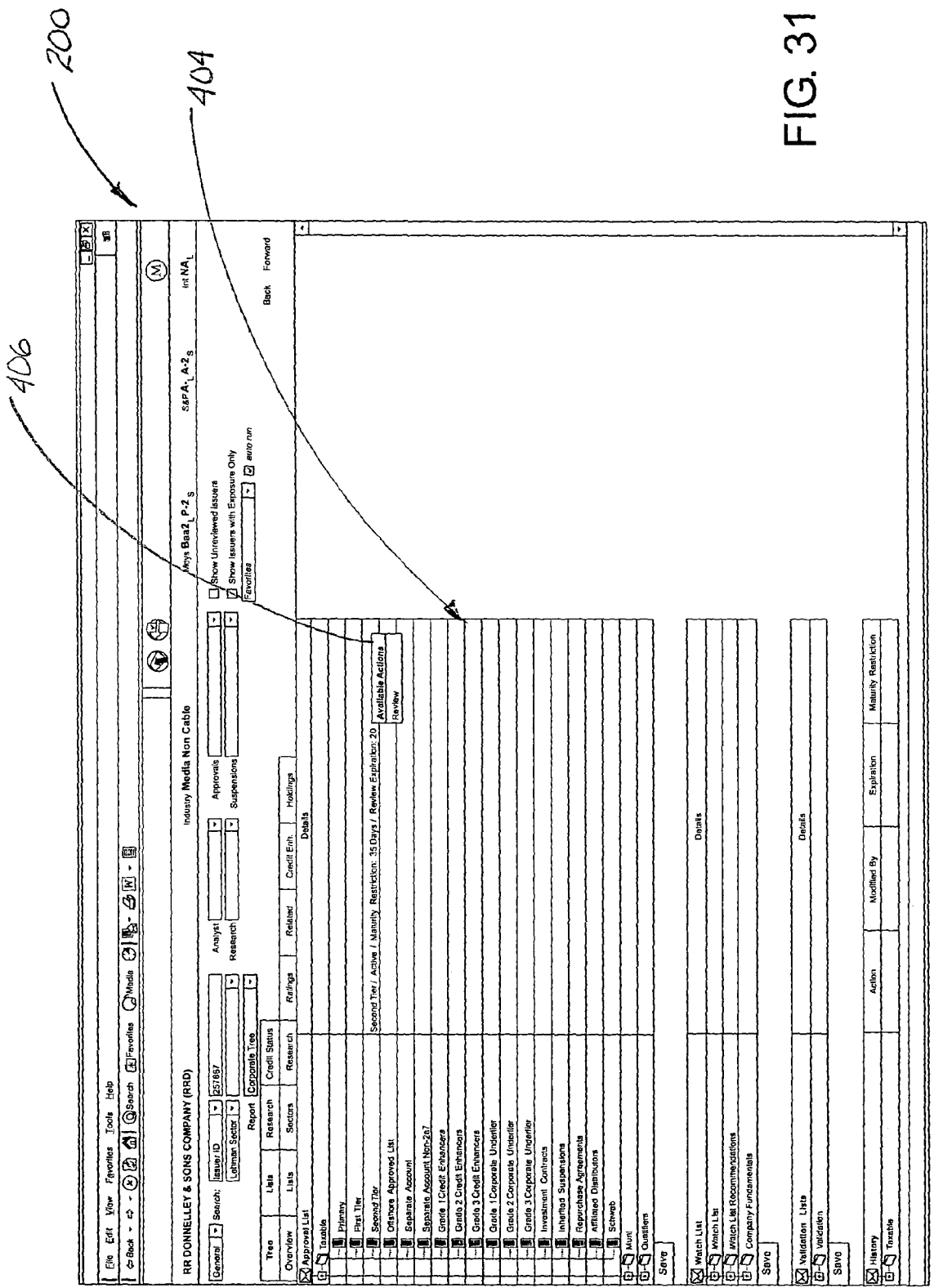
FIG. 31 shows the approval lists table of FIG. 30, in an expanded condition, with the available actions menu presented for enabling a credit analyst to request approval for an expiring issuer.
Figure 32:
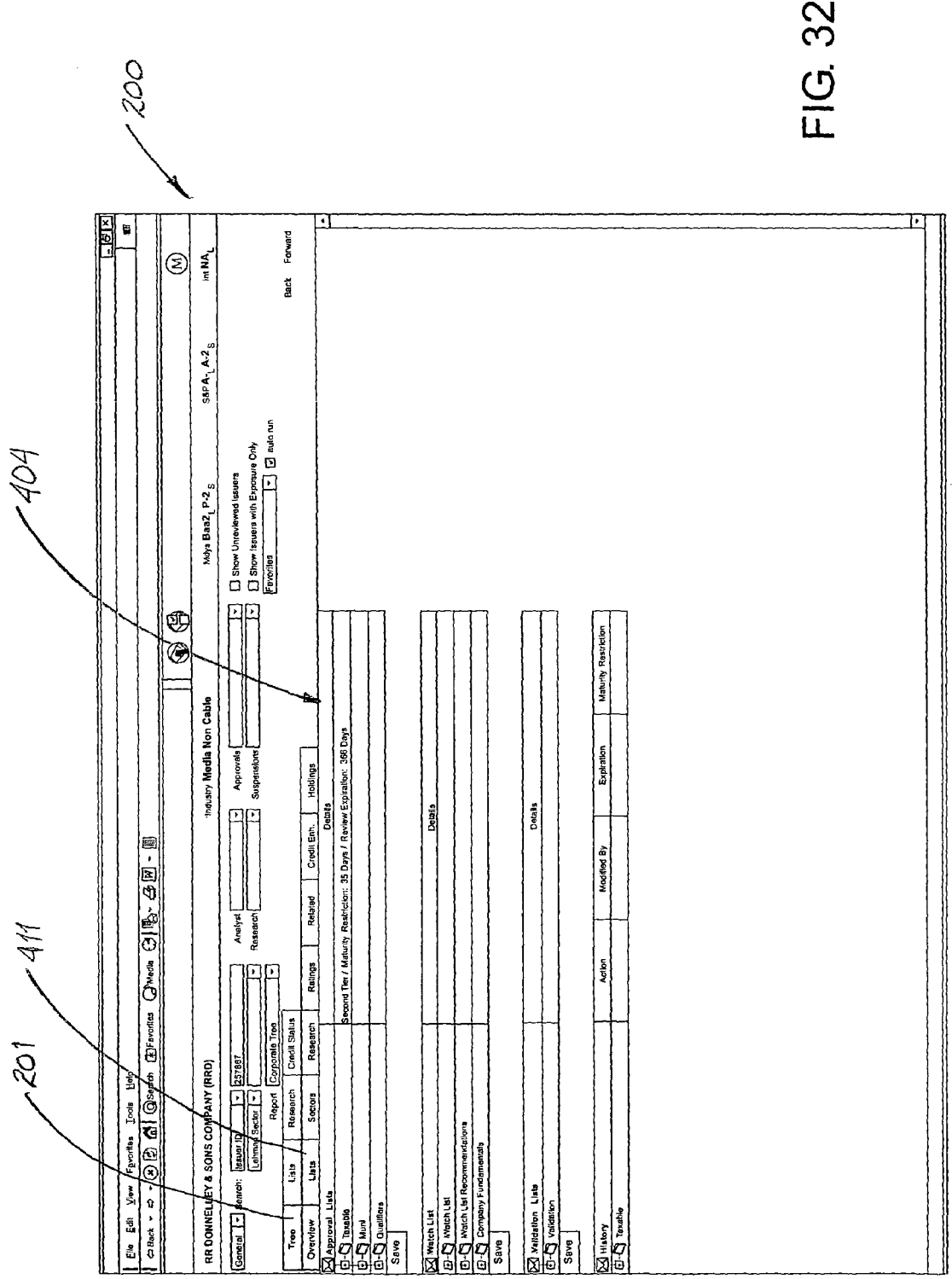
FIG. 32 shows the approval list table of FIG. 30, wherein the approval list table has a revised expiration term.

In the example shown in FIG. 30, according to the information in table 404, the issuer "RR Donnelly & Sons Company" will expire from the Second Tier approval list for Taxable Issues in 20 days. To change the expiration period from 20 days to a longer client-defined period, the user opens the available actions menu 406 by clicking on or otherwise selecting the number of days data link in table 404, as illustrated in FIG. 31. By selecting the "Review" option in menu 406, the user commits the approval request for consideration. If and when the change is executed, the new expiration period for the Second Tier Taxable Issuer list is provided in the approval lists table 404, as shown in FIG. 32. Also shown in FIG. 32, is a Watch List table, a Valuations table and History table providing additional issuer lists and information.

Figure 33:
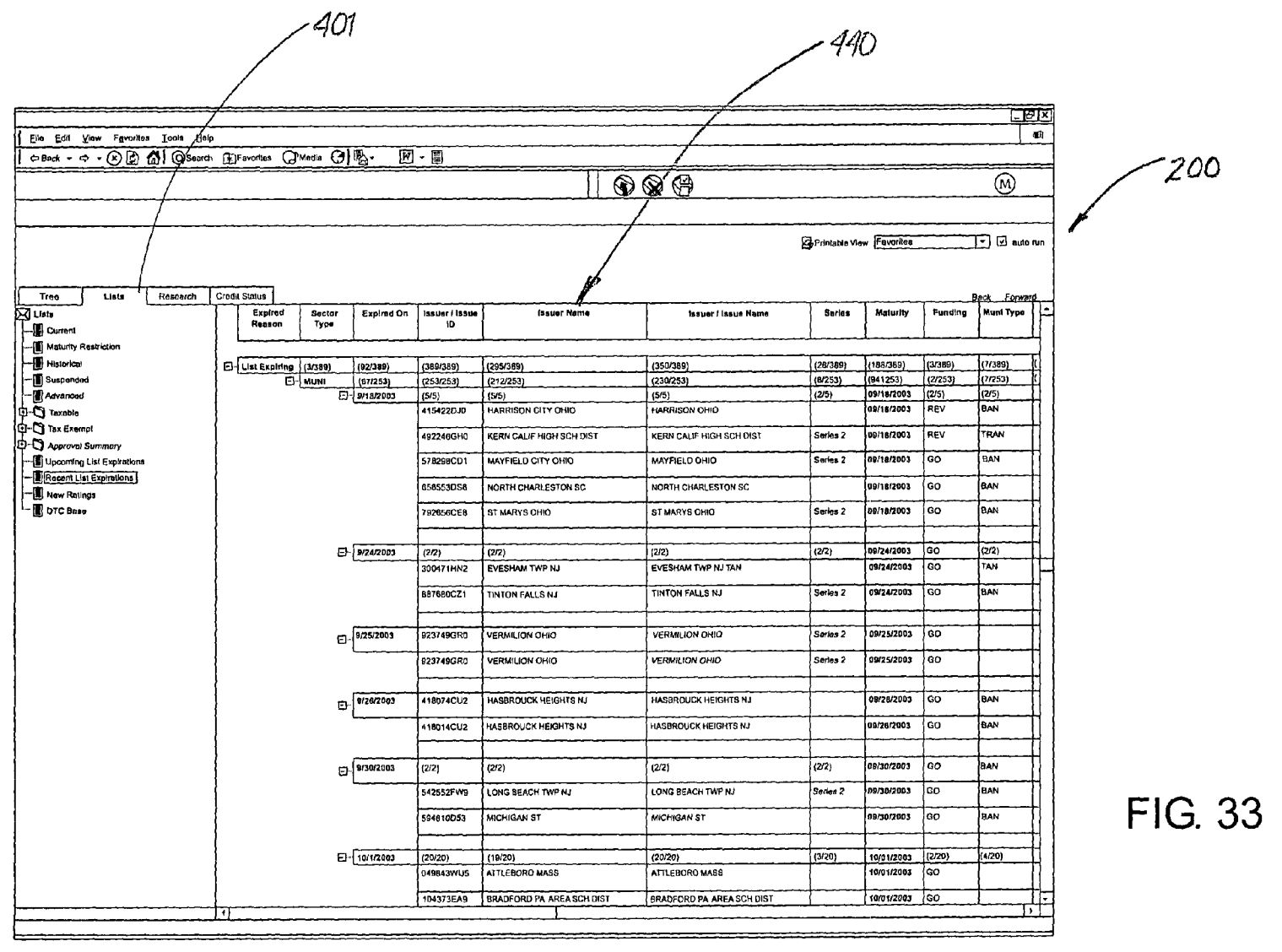
Figure 34:
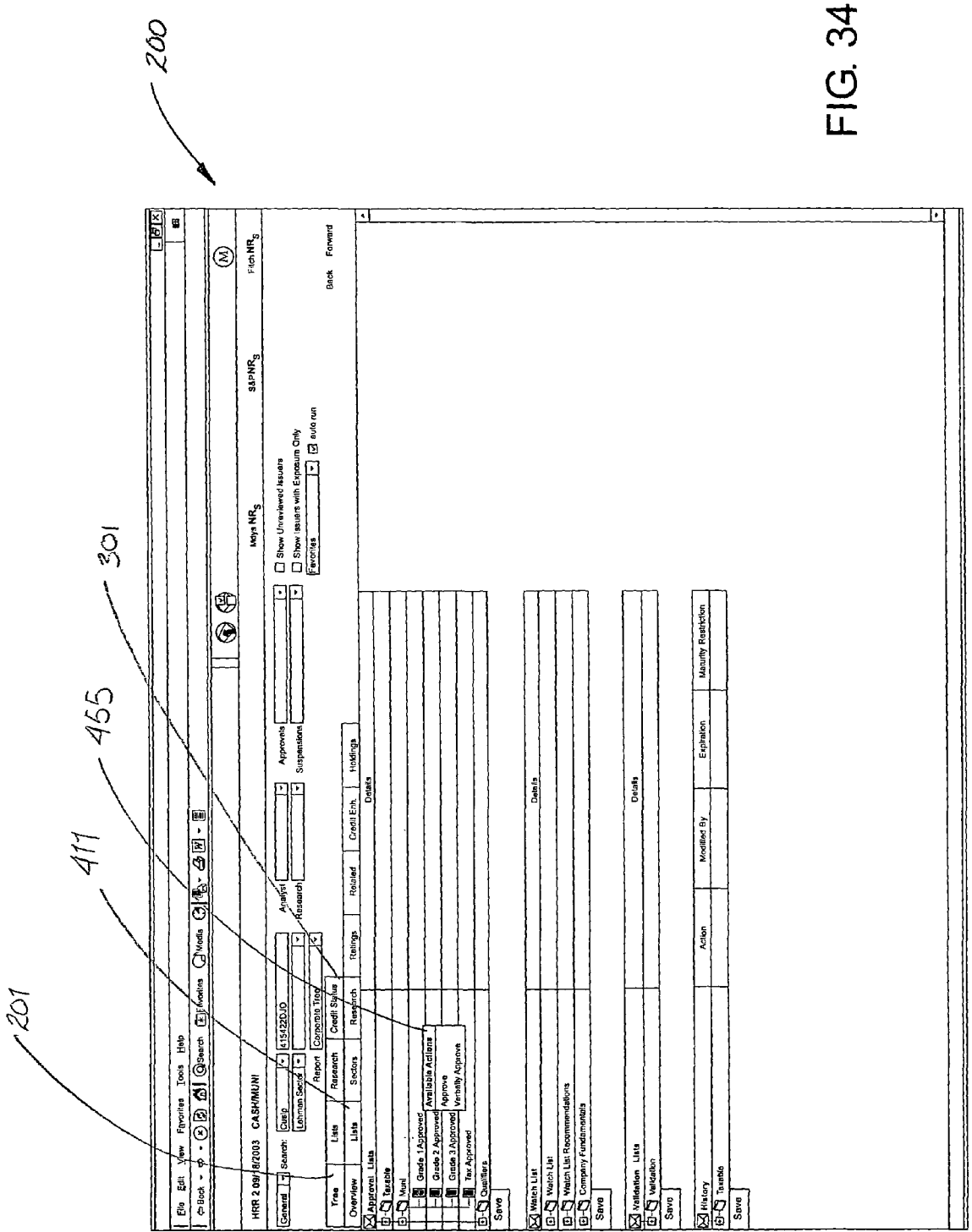
FIG. 34 shows the graphical user interface of FIG. 19 with an available actions menu presented for enabling a credit analyst to request approval for a recently expired issuer.

Referring to FIG. 33, graphical user interface 200 also enables a credit analyst to load and review recent approval list expirations stored in the issuer database. More particularly, by way of list expirations table 440, accessed through "Lists" sub-tab 411, a credit analyst can locate and review issuers that have recently expired from their approval lists (e.g., within the past three months). Once located and reviewed, the credit analyst can request approval for the issuer. As described above with respect to the upcoming expirations list, the user first accesses the Approval Lists tree. Then, for example, as shown in FIG. 34, through the Municipal sub-tree of the Approval List tree, the user selects a specific approval list name (e.g., Grade 1 Approved). This opens the available actions menu 455. From menu 455, the user can either request Approval or Verbal Approval for the issuer of interest. If approved, the issue will be added to the list. During this period of review, the user can monitor the status of the request by selecting the "Credit Status" tab 301 revealing the workflow request table 304, shown in FIG. 27.

Figure 35:
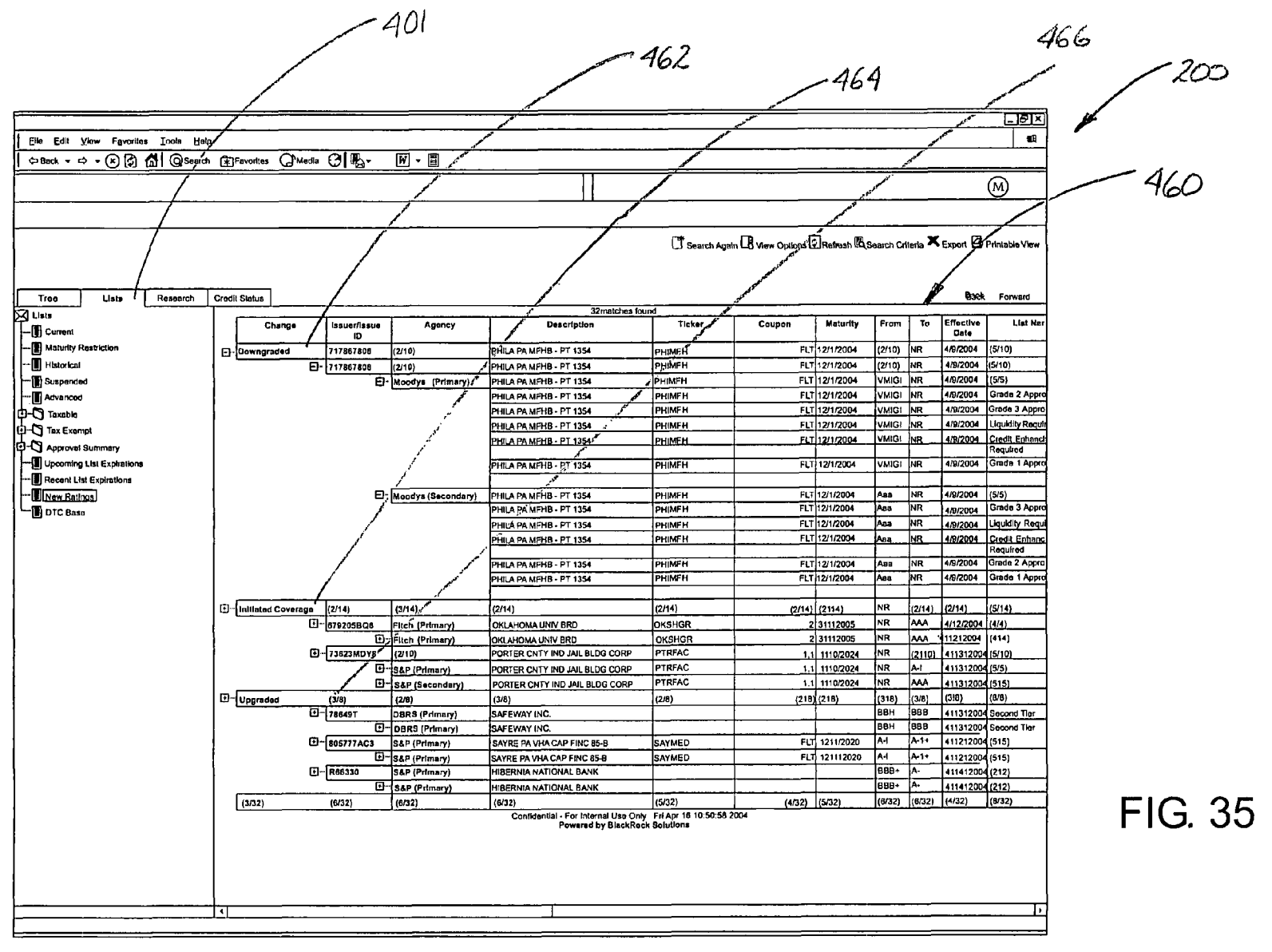

Referring now to FIG. 35, graphical user interface 200 also enables a credit analyst to track, locate and review issuers that have experienced a ratings change (upgraded or downgraded) or for which coverage has been initiated within a particular period of time (e.g., within the past five business days), and to review approval lists related thereto. This is accomplished, through a menu accessed from "List" tab 401, by loading recent credit rating changes from the issuer database into the new ratings table 460. Table 460 is comprised of a Downgraded issuer table 462, an Initiated Coverage table 463 and an Upgraded issuer table 466. These tables identify, among other things, the old rating and the new rating for each listed issue/issuer. The user can access an approval list as described above, by way of the Approval Lists tree under the "Lists" sub-tab 411, and then request a credit approval list change for an issuer when a credit rating therefore has been upgraded or downgraded, or when coverage has been initiated for the issuer.

Figure 36:
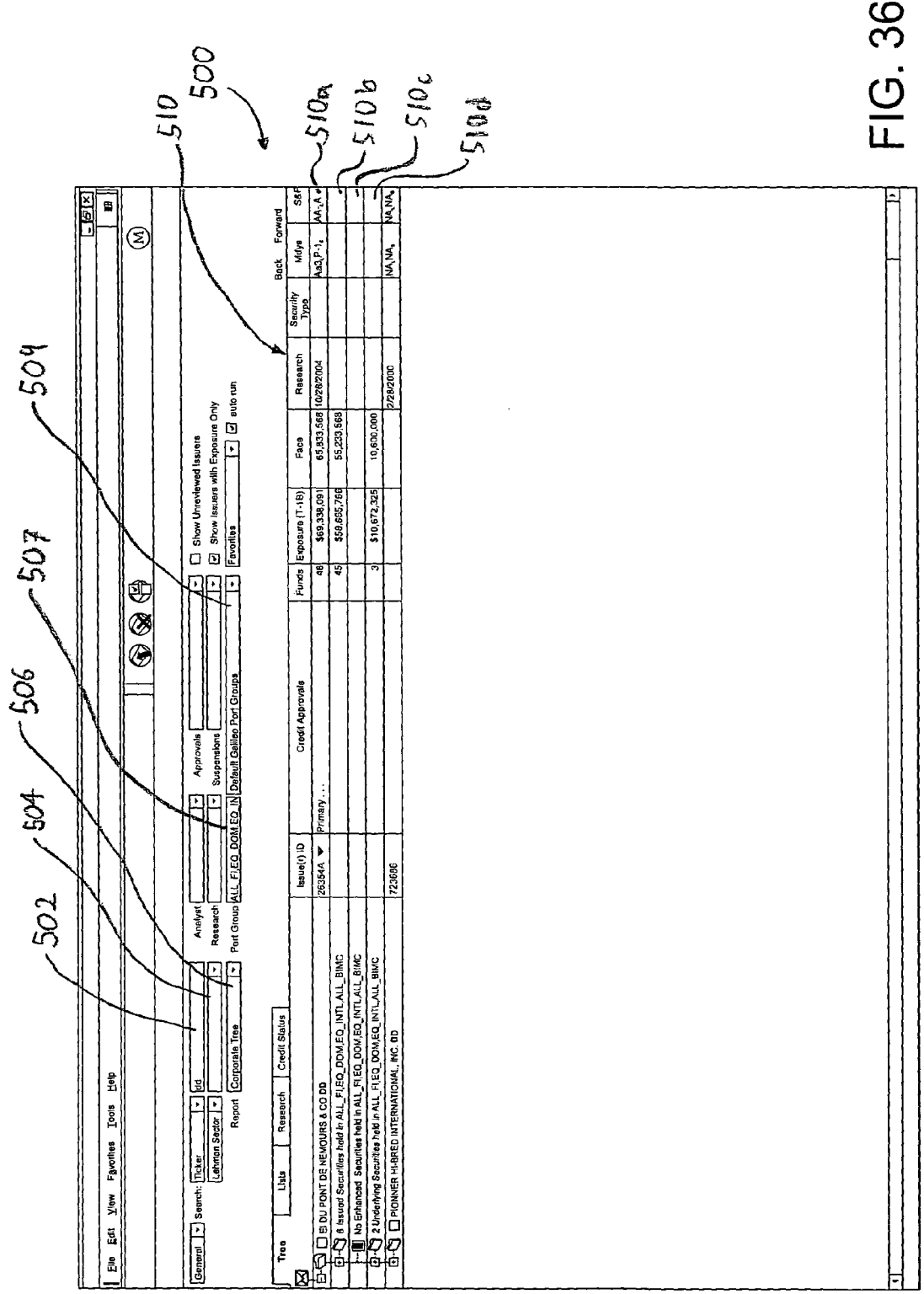
FIG. 36 shows the graphical user interface of FIG. 19 with an exemplary family tree for an entity (E.I. du Pont de Nemours and Company) in the "collapsed" view illustrating the exposure of the selected portfolio groups to the categories and amount of issued securities, enhanced securities and underlying securities in connection with this entity.

Referring now to FIGS. 36 and 37, there is depicted another embodiment of the graphical user interface shown in FIG. 19, which is designated generally by reference numeral 500. In this embodiment, the exposure values relating to selected corporate entities can be compared across portfolio groups. As discussed above, a credit analyst loads issuer data into graphical user interface 500 by entering either a ticker symbol in field 502 and/or an industry sector in field 504. In the instant example, the ticker symbol "DD" is entered in field 502 to load issuer data relating to E.I. Du Pont De Nemours & Co. The credit analyst can also enter the format for the presentation of the issuer data, by entering a report format in field 506. The selection "Corporate Tree" is entered in field 506, which, as discussed above, causes the requested issuer data to be presented based upon the familial relationship of the selected corporate entities. The portfolio group "All_FI,EQ_DOM,EQ_INTL,ALL_BIMC" is selected in field 507, or picked from a drop down menu list in field 509. In this embodiment, "Default Galileo Port Groups" is entered in field 509.

FIG. 36 illustrates table 510 in collapsed form, while FIG. 37 shows the expanded version of table 510 (expanded in this example by selecting the standard hierarchal symbols adjacent the file folders). The top row 510*a* in table 510 contains the ultimate parent in the corporate family. Rows 510*b*, 510*c* and 510*d* immediately beneath row 510*a* illustrate exposure values, among other things, for issued securities, enhanced securities and underlying securities. Thus, in this embodiment, table 510 reveals that E.I. Du Pont De Nemours & Co. is the direct issuer of eight (8) securities held in the portfolio group All_FI,EQ_DOM,EQ_INTL,ALL_BIMC, selected in field 507. E.I. Du Pont De Nemours & Co. is not an enhancer for any securities held in the All_FI,EQ_DOM,EQ_INTL, ALL_BIMC portfolio group, but is a corporate underlier for two (2) securities held in this portfolio group.

In this exemplary embodiment, the exposure values (i.e., market value at the time of this analysis) of the aforementioned eight (8) directly issued securities and two (2) securities in which E.I Du Pont De Nemours & Co. is the underlier are shown in the corresponding rows of table 510 along with the combined total exposure value of both in row 510*a*. The total exposure value in row 510*a* represents the total exposure of the All_FI,EQ_DOM,EQ_INTL,ALL_BIMC portfolio to E.I. Du Pont De Nemours & Co. as an entity. Thus, should this entity default, the analyst can readily determine that the associated loss would likely be the combined issued and underlying total. The potential losses may be underestimated without such features that capture enhanced and underlying securities along with directly issued securities for exposure analysis.

FIG. 37 expands the E.I. Du Pont De Nemours & Co. corporate family tree to reveal the specific securities within the portfolio selected in field 507 that contribute to the exposure values. The eight (8) directly issued securities are listed individually, including the type of security, identifier and corresponding exposure associated therewith. In addition, the municipal bonds for which E.I. Du Pont De Nemours & Co. is the underlier are also identified individually and provided along with the aforementioned corresponding information. It should be noted that the "Show issuers with Exposure Only" checkbox 511 is checked so that only securities within the All_FI,EQ_DOM,EQ_INTL,ALL_BIMC portfolio are included in the expanded view of table 510 shown in FIG. 37. Unchecking box 511 would show all directly issued, enhanced, and underlying securities associated with E.I. Du Pont De Nemours & Co., whether contained in the All_FI, EQ_DOM,EQ_INTL,ALL_BIMC portfolio or not.

Although the system and method of the subject invention have been described with respect to preferred embodiments, those skilled in the art will readily appreciate that changes and modifications may be made thereto without departing from the spirit and scope of the subject invention as defined by the appended claims. For example, while the graphical user interfaces described and illustrated are focused on managing credit risk with respect to issuers of fixed income securities, those skilled in the art will readily appreciate that the system of the subject invention can be readily utilized to evaluate the credit risk associated with individual securities, and this is considered well within the scope of the subject invention.

What is claimed is:

1. A system for enabling a credit analyst to evaluate credit risk associated with an issuer of securities based on subjective research, comprising:

a) a server;
 b) a database connected to the server, the database containing credit-worthiness data including subjective credit research notes relating to a plurality of issuers of securities;
 c) a processor disposed in communication with memory having plurality of instructions, the processor configured to execute the plurality of instructions to perform the following steps:
  load credit-worthiness data relating to a selected issuer of securities, including the subjective credit research notes, from the database onto the server and into a graphical user interface displayed in a data terminal, wherein the credit-worthiness data relating to the selected issuer of securities is presented to a credit analyst within the graphical user interface in a format based on a corporate family tree relationship of the selected issuer of securities;
  retrieve a portion of the subjective credit research notes stored in the database based on user specified search criteria; and
  display on a display device the retrieved portion of the subjective credit research notes for a selected issuer of securities together with the credit-worthiness data for the selected issuer of securities
 in the corporate family tree format that includes at least a subject associated with each of the subjective research notes.

2. A system as recited in claim 1, wherein the search criteria for retrieving research notes is based on publication date.

3. A system as recited in claim 1, wherein the search criteria for retrieving research notes is based on a research category.

4. A system as recited in claim 1, wherein the search criteria for retrieving research notes is based on an industry sector.

5. A system as recited in claim 2, wherein the processor is further configured to execute instructions to enable viewing of the textual content of a research note that has been retrieved.

6. A system as recited in claim 1, wherein the processor is further configured to execute instructions to create a report that contains the textual content of research notes based upon user specified search criteria.

7. A system as recited in claim 6, wherein the search criteria for creating a report that contains the textual content of research notes is based on publication date.

8. A system as recited in claim 6, wherein the search criteria for creating a report that contains the textual content of research notes is based on a research category.

9. A system as recited in claim 6, wherein the search criteria for creating a report that contains the textual content of research notes is based on an industry sector.

10. A system as recited in claim 1, wherein the processor is further configured to execute instructions to add new research notes to the database for subsequent retrieval.

11. A system as recited in claim 10, wherein the processor is further configured to execute instructions to add a new research note to a corporate family tree.

12. A system as recited in claim 10, wherein the processor is further configured to execute instructions to add a research note to an industry sector.

* * * * *